United States Patent
Yu et al.

(10) Patent No.: US 12,450,475 B1
(45) Date of Patent: Oct. 21, 2025

(54) TUNED EXECUTABLE CODE SERVICE FOR MACHINE LEARNING MODELS

(71) Applicant: Amazon Technologies, Inc., Seattle, WA (US)

(72) Inventors: Hao Yu, Sunnyvale, CA (US); Xingjian Shi, Sunnyvale, CA (US); Zhi Chen, Santa Clara, CA (US); Haichen Shen, Mountain View, CA (US); Mu Li, Palo Alto, CA (US); Yida Wang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1255 days.

(21) Appl. No.: 17/203,619

(22) Filed: Mar. 16, 2021

(51) Int. Cl.
| | |
|---|---|
| *G06F 9/50* | (2006.01) |
| *G06F 9/44* | (2018.01) |
| *G06N 3/04* | (2023.01) |
| *G06N 3/08* | (2023.01) |
| *G06N 3/098* | (2023.01) |
| *G06N 3/0985* | (2023.01) |
| *G06N 20/20* | (2019.01) |

(52) U.S. Cl.
CPC .............. *G06N 3/08* (2013.01); *G06F 9/44* (2013.01); *G06F 9/5027* (2013.01); *G06N 3/04* (2013.01); *G06N 3/098* (2023.01); *G06N 3/0985* (2023.01); *G06F 9/5005* (2013.01); *G06N 20/20* (2019.01)

(58) Field of Classification Search
None
See application file for complete search history.

(56) References Cited

U.S. PATENT DOCUMENTS

| | | | | |
|---|---|---|---|---|
| 10,257,275 | B1 * | 4/2019 | Dirac | H04L 67/1097 |
| 11,797,340 | B2 * | 10/2023 | Cao | G06F 9/5005 |
| 12,067,420 | B2 * | 8/2024 | Cho | G05D 1/646 |
| 2016/0092275 | A1 * | 3/2016 | Booman | G06F 9/4881 718/103 |
| 2016/0110657 | A1 * | 4/2016 | Gibiansky | G06N 20/00 706/12 |
| 2018/0113742 | A1 * | 4/2018 | Chung | G06F 9/4881 |

(Continued)

OTHER PUBLICATIONS

Martin Abadi, et al., "TensorFlow: A system for large-scaling machine learning", USENIX Association, 12th USENIX Symposium on Operating Systems Design and Implementation, Nov. 2-4, 2016, pp. 265-283.

(Continued)

*Primary Examiner* — Abu Zar Ghaffari
(74) *Attorney, Agent, or Firm* — Robert C. Kowert; Kowert, Hood, Munyon, Rankin & Goetzel, P.C.

(57) ABSTRACT

Tuning result records indicating tuned schedules for machine learning tuning tasks are stored at a data store accessed from a tuning service. A given schedule indicates at least an order in which sub-operations of a tuning task are to be executed. In response to determining that the data store does not include a result record whose tuning task meets a similarity criterion to a tuning task determined from a tuning request, performance predictions for a set of candidate schedules are obtained using a performance prediction model, without running code which executes the candidate schedules. In a response to the tuning request, executable code corresponding to a preferred schedule identified from the candidate schedules using the performance predictions is included.

20 Claims, 12 Drawing Sheets

(56) References Cited

U.S. PATENT DOCUMENTS

| | | | |
|---|---|---|---|
| 2018/0240041 A1* | 8/2018 | Koch | G06N 3/126 |
| 2019/0095819 A1* | 3/2019 | Varadarajan | G06F 9/505 |
| 2019/0213056 A1* | 7/2019 | Johnson | G06N 7/01 |
| 2019/0318225 A1* | 10/2019 | Heinecke | G06F 9/45516 |
| 2020/0097847 A1* | 3/2020 | Convertino | G06F 11/3447 |
| 2020/0125545 A1* | 4/2020 | Idicula | G06N 20/20 |
| 2020/0327412 A1* | 10/2020 | McCourt | G06N 20/20 |
| 2020/0387807 A1* | 12/2020 | Stassen | G06N 3/063 |
| 2021/0224585 A1* | 7/2021 | Schmidt | G06F 9/3836 |
| 2021/0271966 A1* | 9/2021 | Wang | G06N 3/08 |
| 2021/0334651 A1* | 10/2021 | Leng | G01S 17/894 |
| 2022/0076114 A1* | 3/2022 | Shaker | G06Q 10/08355 |
| 2022/0180241 A1* | 6/2022 | Song | G06N 20/00 |

OTHER PUBLICATIONS

Andrew Adams, et al., "Learning to Optimize Halide with Tree Search and Random Programs", ACM Transactions on Graphics, vol. 38, No. 4, Article 121, Jul. 1, 2019, pp. 1-12.

Han Cai, et al., "ProxylessNAS: Direct Neural Architecture Search on Target Task and Hardware", arXiv:1812.00332v2, Feb. 23, 2019, pp. 1-13.

Tianqi Chen, et al., "XGBoost: A Scalable Tree Boosting System", arXiv:1603.02754v3, Jun. 10, 2016, pp. 1-13.

Tianqi Chen, et al., "MXNet: A Flexible and Efficient Machine Learning Library for Heterogeneous Distributed Systems", arXiv:1512.01274v1, Dec. 3, 2015, pp. 1-6.

Tianqi Chen, et al., "TVM: An Automated End-to-End Optimizing Compiler for Deep Learning", in Proceedings of the 13th USENIX Symposium on Operating Systems Design and Implementation (OSDI '18), Oct. 8-10, 2018, pp. 579-594.

Tianqi Chen, et al., "Learning to Optimize Tensor Programs", arXiv:1805.08166v4, Jan. 8, 2019, pp. 1-16.

Sharam Chetlur, et al., "cuDNN: Efficient Primitives for Deep Learning", arXiv:1410.0759v3, Dec. 18, 2014, pp. 1-9.

Yann N. Dauphin, et al., "Language Modeling with Gated Convolutional Networks", in Proceedings of the 34th International Conference on Machine Learning, PMLR 70, 2017, pp. 1-9.

Xiaotian Gao, et al., "OpEvo: An Evolutionary Method for Tensor Operator Optimization", arXiv:2006.05664v2, Dec. 12, 2020, pp. 1-11.

Andrey Gulin, et al., "Winning the Transfer Learning Track of Yahoo!'s Learning to Rank Challenge with YetiRank", JMLR: Workshop and Conference Proceedings 14, 2011, pp. 63-76.

Jian Guo, et al., "GluonCV and GluonNLP: Deep Learning in Computer Vision and Natural Language Processing", Journal of Machine Learning Research 21, 2020, pp. 1-7.

Segey Ioffe, et al., "Batch Normalization: Accelerating Deep Network Training by Reducing Internal Covariate Shift", in Proceedings of the 32nd International Conference on Machine Learning, JMLR: W&CP, vol. 37, 2015, pp. 1-9.

Kalervo Jarvelin, et al., Cumulated Gain-Based Evaluation of IR Techniques, ACM Transactions on Information Systems, vol. 20, No. 4, Oct. 2002, pp. 422-446.

S, Kirkpatric, et al., "Optimization by Simulated Annealing", Science, May 13, 1983, vol. 220, No. 4598, pp. 671-680.

Rui Li, et al., "Analytical Cache Modeling and Tilesize Optimization for Tensor Contractions", in Proceedings of the International Conference for High Performance Computing, Networking, Storage and Analysis, Nov. 17-22, 2019, pp. 1-13.

Yizhi Liu, et al., "Optimizing CNN Model Inference on CPUs", in Proceedings of the 2019 USENIX Annual Technical Conference, Jul. 10-12, 2019, pp. 1025-1039.

Ilya Loshchilov, et al., "SGDR: Stochastic Gradient Descent with Warm Restarts", arXiv:1608.03983v5, May 3, 2017, pp. 1-16.

Ravi Reja Mullapudi, et al., "Automatically Scheduling Halide Image Processing Pipelines", SIGGRAPH '16 Technical Paper, DOI: http://dx.doi.org/10.114/2897824.2925952, Jul. 2016, pp. 1-11.

Adam Paszke, et al., "PyTorch: An Imperative Style, High-Performance Deep Learning Library", arXiv:1912.01703v1, Dec. 3, 2019, pp. 1-12.

Liudmila Prokhorenkova, et al., "CatBoost: unbiased boosting with categorical features", arXiv:1706.09516v5, Jan. 20, 2019, pp. 1-23.

Colin Raffel, et al., "Exploring the Limits of Transfer Learning with a Unified Text-to-Text Transformer", Journal of Machine Learning Research 21, 2020, pp. 1-67.

Jonathan Ragan-Kelley, et al, "Halide: A Language and Compiler for Optimizing Parallelism, Locality, and Recomputation in Image Processing Pipelines", ACM SIGPLAN Notices, 48(6), 2013, pp. 519-530.

Vijay Janapa Reddi, et al., "MLPerf Inference Benchmark", arXiv:1911.02549v2, May 9, 2020, pp. 1-15.

Savvas Sioutas, et al, "Schedule Synthesis for Halide Pipelines on GPUs", Retrieved from https://dl.acm.org/doi/fullHtml/10.1145/3406117 on Mar. 16, 2021, pp. 1-24.

Sanket Tavarageri, et al., PolyDL: Polyhedral Optimizations for Creation of High-performance DL Primitives, ACM Transactions on Architecture and Code Optimization, vol. 18, No. 1, Article 11, Jan. 2021, pp. 1-27.

Nicolas Vasilache, et al., "Tensor Comprehensions: Framework-Agnostic High-Performance Machine Learning Abstractions", arXiv:1802.04730v3, Jun. 29, 2018, pp. 1-37.

Hanrui Wang, et al., "HAT: Hardware-Aware Transformers for Efficient Natural Language Processing", arXiv:2005.14187v1, May 28, 2020, pp. 1-14.

Xuanhui Wang, The LambdaLoss Framework for Ranking Metric Optimization, CIKM '18, Oct. 22-26, 2018, https://doi.org/10.1145.3269206.321784, pp. 1-10.

Lianmin Zheng, et al., "Ansor: Generating High-Performance Tensor Programs for Deep Learning", 14th USENIX Symposium on Operating Systems Design and Implementation, Nov. 4-6, 2020, pp. 863-879.

Size Zheng et al., "FlexTensor: An Automatic Schedule Exploration and Optimization Framework for Tensor Computation on Heterogeneous System", ASPLOS'20, Mar. 16-20, 2020, pp. 859-873.

Jia Deng, "Large Scale Visual Recognition", A Dissertation Presented to the Faculty of Princeton University in Candidacy for the Degree of Doctor of Philosophy, Jun. 2012, pp. 1-148.

* cited by examiner

*Orders-of-magnitude performance improvements can be obtained by tuning ML models for specified execution environments, e.g., using auto-tuning frameworks and tools,* ← Problem
*but the tuning can take substantial amounts of time and resources*

↓ Solution

Implement cloud-based tuning service which pre-populates (and grows) database of tuned schedules for popular ML operators, models and HEEs  330

For tuning requests which result in database hits, provide pre-generated tuned code or tuned schedules in real time  340

For tuning requests which result in database misses, use pre-trained performance prediction model to identify schedules likely to perform close to tuned schedules (without running extensive tuning experiments), provide corresponding "almost-as-good-as-tuned" code for the best-performing schedule of the set within seconds/minutes; optionally, conduct full tuning experiments asynchronously to add new tuned schedules to database  350

FIG. 3

TUNED EXECUTABLE CODE SERVICE FOR MACHINE LEARNING MODELS

BACKGROUND

The use of machine learning algorithms is becoming increasingly popular for addressing numerous types of problems, including text analysis, image analysis and the like. Deep learning machine learning models, comprising multiple layers of neural networks, have been extremely successful in a number of problem domains. Such deep neural network based models (DNNs) can discover several categories of salient characteristics of the input data, starting with low-level features at initial layers (such as rough boundaries between objects or regions in the case of image processing applications) and ending with fine-grained characterization of the input (e.g., distinguishing between different faces or animals) at the final layers closest to the output of the models.

As the popularity and complexity of machine learning algorithms has increased, the search for techniques to speed up the execution of the algorithms has also accelerated. Tools and systems which produce model code optimized for targeted execution environments (such as servers with custom chips designed specifically for machine learning computations) are being improved. For example, compilers have been developed to generate optimized kernel code to help bridge the gaps between machine learning operators (such as various types of convolutions in the case of some DNNs used for image processing, matrix multiplication operators, etc.) used within the models and the capabilities of the targeted execution environments.

Despite the improvement in the available tools, it often takes considerable expertise as well as substantial tuning effort and time to obtain executable code that can satisfy the performance requirements of machine learning based applications. Such extensive tuning can be required because of the very large number of combinations of tuning parameters which may have to be tested, such as parameters governing the order in which the processing of subsets of large multidimensional vectors or tensors is performed. Even when such tuning is conducted with the help of state-of-the-art automated tuning frameworks, it can take days or weeks to complete for a given execution environment.

BRIEF DESCRIPTION OF DRAWINGS

FIG. 3 illustrates an overview of benefits which may be provided by a machine learning code tuning service to its clients, according to at least some embodiments.

Figure 1:
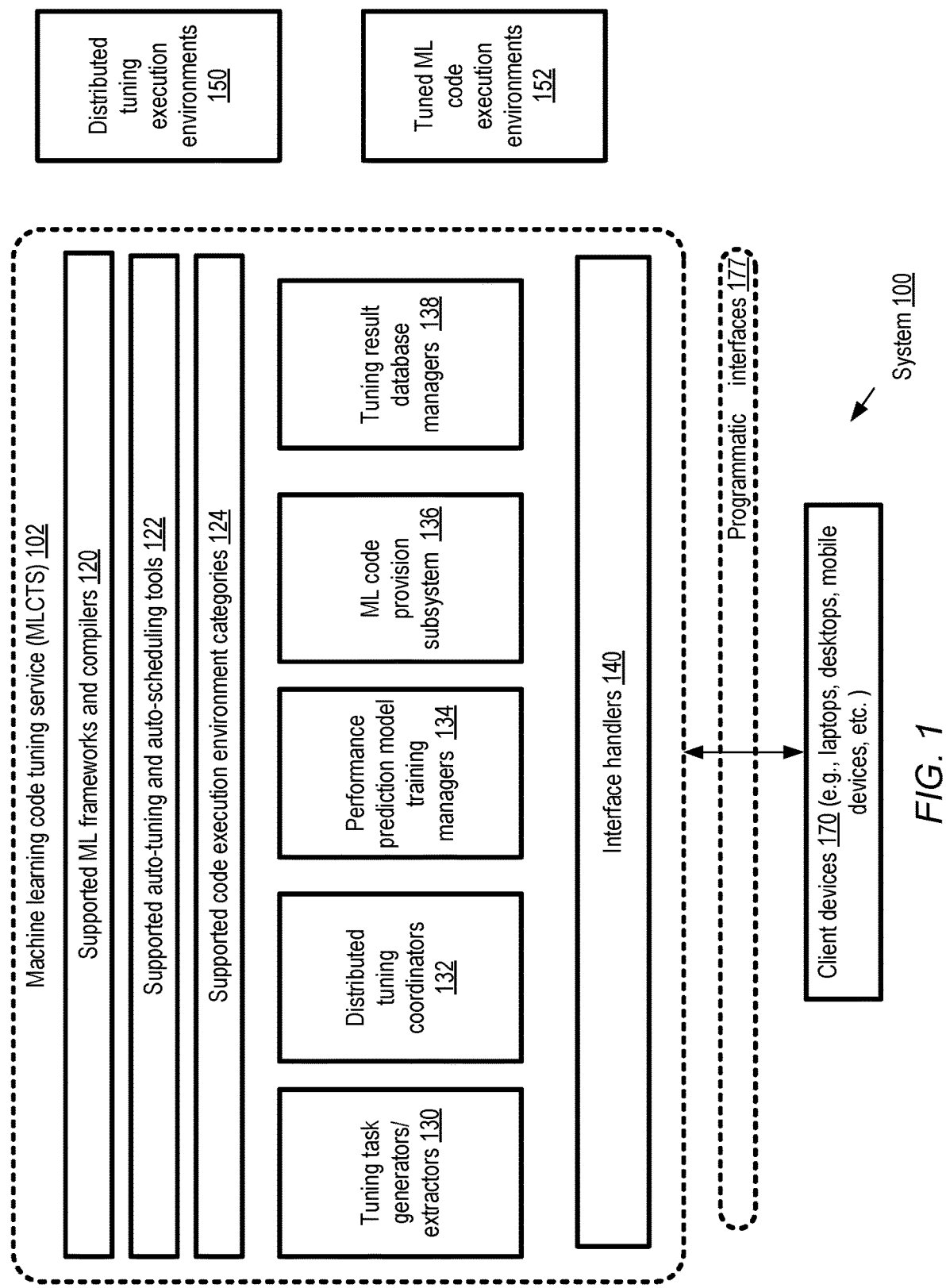
FIG. 1 illustrates an example system environment in which a network-accessible tuning service that reduces the time and resources expended by clients to obtain efficient code for their machine learning models may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for rapidly (e.g., within seconds or a few minutes) providing tuned code for sophisticated machine learning models, using resources and artifacts of a network-accessible machine learning code tuning service, without requiring the clients of such a service to expend effort on tuning the models themselves. Such tuned code may then be run efficiently at hardware execution environments preferred by the clients, in some cases reducing the time taken to run a model by orders of magnitude relative to the time taken to run an un-tuned version of the code.

At a high level, the code tuning service may conduct at least the following types of operations to help speed up the provision of tuned code for the clients in various embodiments. Large-scale distributed tuning experiments may be conducted in a fault-tolerant manner on various popular machine learning models, using a wide variety of hardware and software execution environments and one or more industry-standard auto tuning frameworks. At least some of the tuning experiments may be initiated proactively, e.g., without receiving specific requests to conduct the experiments from clients of the code tuning service. Results of the tuning experiments, including detailed low-level hardware-specific schedules for executing sub-operations of the models, may be stored in a database of the code tuning service. Such a tuning experiment may involve, for example, the automated determination or extraction of tuning tasks from machine learning model source code at any of several levels of granularity (such as operator-level granularity, model sub-graph granularity, or model-level granularity), followed by the coordination of the execution of the tuning tasks at selected hardware environments using an auto-tuning framework, and the collection of performance metrics from the executions. The unit or set of machine learning source code (e.g., code of the entire model or the code of an individual operator such as a matrix multiplication or a 2-dimensional convolution corresponding to a particular layer of a neural network model) which is tuned in a given tuning experiment may be referred to as a tuning target or tuning unit. A given tuning task may comprise measuring the performance of the tuning target at one or more execution environments (such as a particular category of compute instance of a virtualized computing service, a particular processor typically used for an Internet-of-things device, etc.). One or more machine learning models may be trained, e.g., using training data derived from the distributed tuning experiments, for estimating the performance which may be achieved for a tuning target or task at a selected execution environment using a particular schedule, without having to run the tuning target at the execution environment.

When a client submits a code tuning request (e.g., supplying a file containing a model or operator which is to be tuned, and an indication of the execution environment at which the model is to be run), the pre-populated database may first be searched to determine whether a tuned schedule for a tuning task and environment indicated in the request has already been found in at least some embodiments. If such a tuned schedule is available in the database, code corresponding to the tuned schedule (and/or the tuned schedule itself) may be provided very quickly to the client. If the database does not contain an indication of a pre-tuned schedule which matches the request (or is sufficiently similar), the pre-trained performance prediction model may be used to identify a (typically small) set of schedules which are likely to perform well for the tuning task in some embodiments. Such a small set of candidate schedules may be selected, using the model's predictions, from a larger collection of schedules proposed by an automated tuning framework for machine learning models in some embodiments (e.g., one of the frameworks used in some of the distributed tuning experiments). As such, the performance prediction model may be used as a shortcut, to avoid having to run actual experiments on the entire set of proposed schedules (which may in some cases number in the thousands), while still identifying a small group of schedules likely to perform well. Running the model for the proposed schedules may take, for example, on the order of a few seconds, as opposed to the hours or days it may have taken to execute code for all the proposed schedules on the client's preferred execution environments. Then, results for the selected candidate schedules may be obtained, e.g., within a few minutes, by conducting a relatively short set of experiments on the client's preferred execution environments (or on execution environments similar to the client's preferred execution environment). Based on the results of the experiments, code for a particular schedule whose performance was better than those of the other schedules tested may be provided to the client.

As one skilled in the art will appreciate in light of this disclosure, certain embodiments may be capable of achieving various advantages, including some or all of the following: (a) substantially reducing the overall amount of computation, storage and networking resources required to tune complex machine learning models, including for example deep learning models, for efficient execution at preferred execution environments, (b) improving the quality of application results that rely on machine learning models, by providing high-quality inference results via tuned code produced for the models regardless of the hardware execution environment selected for the models, and/or (c) reducing the workload of application administrators and data scientists responsible for ensuring that the performance of a machine learning model is acceptable.

According to some embodiments, a system may comprise one or more computing devices, e.g., of a machine learning code tuning service (MLCTS) of a provider network or cloud computing environment. The MLCTS may also be referred to as a code tuning service or simply as a tuning service, and may in one embodiment be implemented as a component of a larger machine learning service or analytics service of the cloud computing environment. The MLCTS in various embodiments may provide executable code which enables a machine learning model to be run fast on selected hardware execution environments; as such, the tuning performed with the help of the service in such embodiments may influence the performance achieved during the running of the model, rather than modifying the internal inference-related logic of the model. The computing devices may include instructions that upon execution on or across the one or more computing devices cause the one or more computing devices to perform one or more distributed tuning experiments using at least some resources of a tuning service of a cloud computing environment. The experiments may generate a plurality of tuning result records. An individual tuning result record may include, for example, respective representations of (a) a tuning task comprising at least a portion of a machine learning model, (b) a tuned schedule for executing one or more sub-operations of the tuning task at a particular execution environment, and (c) a performance result obtained by running executable code corresponding to the tuned schedule at the particular execution environment. The tuned schedule may for example indicate an order in which the one or more sub-operations are to be executed, a sequence in which various memory allocation operations are to be conducted relative to computations of the tuning task, an order in which steps of loops of computation on multi-dimensional data are executed with respect one another, a manner in which a vector should be split before performing computations on the results of the split, and so on in some embodiments. In some cases in which the machine learning model being tuned is a deep neural network model comprising multiple layers, a schedule may for example indicate a traversal order of a vector or tensor for processing contents of the vector or tensor at a particular layer of the model, the order in which one or more memory acquisition operations are to be interleaved with one or more computations, a stride parameter, and/or a tiling parameter. The tuning result records may be stored in a database of the MLCTS in various embodiments. At least some of the tuning experiments may be initiated without being triggered by specific requests from clients of the MLCTS—that is, a distributed tuning experiment may in some cases be performed at the initiative of the MLCTS, without being prompted by a client-submitted request.

Various tuning requests may be received at the MLCTS, e.g., via programmatic interfaces from clients. From a given tuning request, one or more tuning tasks may be extracted or determined at the MLCTS. For each of the tuning tasks, the database may be searched for a matching tuning result record, or a tuning result record whose tuning task meets a similarity criterion with respect to the requested tuning task. If a result record with such a matching (or sufficiently similar) tuning task is present in the database, executable code corresponding to a tuned schedule indicated in the result record may be provided in a response to the client in at least some embodiments. Similarity between tuning tasks for which a result record exists in the database may be estimated along any combination of several dimensions in different embodiments. For example, in some cases, the pre-existing record may contain a result for a model or operator expressed using a particular version V1 of a machine learning framework, but the model or operator for which a client has submitted a tuning request may be expressed using a newer version V2 of the framework; in such a scenario, the two tuning tasks may be considered similar because the logic of the model is the same in both cases, even though the versions of the frameworks are not identical. In other cases, the logic of the model (or operator) may itself differ somewhat between the database entry and the client request (while the framework version is the same), and the MLCTS may be able to use an embedding methodology to determine that the models or operators are sufficiently similar that the tuned schedule stored in the database can be used to generate executable code for the client. In one such embedding-based approach, a high dimensional representation of the tuning units or tasks stored in the database may be generated, and the distances (e.g., cosine distances or the like) between the embedding representations of the requested task and stored tasks may be computed to determine similarity, with smaller distances denoting greater similarities.

If the database does not contain tuned schedule for a sufficiently similar or matching tuning task with respect to the tuning task of the client request, a performance prediction model may be utilized to help prepare the response to the client request in various embodiments. The performance prediction model may also be referred to as a prediction cost model in some embodiments. Respective performance predictions corresponding to a set of proposed schedules (also referred to as candidate schedules) identified by an auto-tuning framework for the client's requested tuning task may be obtained using such a model, e.g., without running code which executes the proposed schedules in at least some embodiments. A subset of such proposed schedules which are likely to perform better than others may be selected using the performance prediction model. The performance prediction model may assign respective scores to each candidate schedule in some embodiments, indicating the relative performance expected from the different candidates—as such, the predictions may be useful in ranking the candidates in such embodiments even if predictions for the raw or absolute metrics such as latency (elapsed time) or throughput are not generated for the schedules. Then, code corresponding to individual ones of the subset of proposed schedules may be executed to obtain corresponding performance results. A preferred schedule may be identified based on metrics collected from such executions, and executable code corresponding to the preferred schedule may be provided in a response to the client from which the tuning request was received.

In addition to an indication of a tuning task, the tuned schedules identified for the tuning task, and the performance metrics achieved for the tuning task, a tuning result record stored at the database of the MLCTS may include additional elements in some embodiments. For example, machine learning models are typically developed using a machine learning framework such as PyTorch or TensorFlow, and tuned using auto-tuning frameworks such as AutoTVM, and the version of the framework(s) used for the model and/or the auto-tuning which led to the identification of the tuned schedule may be stored in a result record in some embodiments. The tuned schedule included in a result record may in effect indicate the "best" schedule identified among a set of schedules explored on the targeted execution environment using the auto-tuning framework.

In at least one embodiment, a number of results obtained for a set of schedules (which eventually led to the selection of the tuned schedule, but represent schedules other than the particular schedule eventually selected as the tuned or "best" schedule) may be stored in one or more tuning experiment logs. An identifier or path (e.g., a URL of the log file(s), the paths of the log file within a distributed file system, etc.) which can be used to access such logs generated as a by-product of the set of tests which led to the selection of the tuned schedule (e.g., tests run as part of the distributed tuning experiments involving large numbers of execution environments) may be included in the result record comprising the tuned schedule in at least one embodiment. Such logs may be used to generate or derive training data records for the performance prediction model in at least some embodiments—e.g., features representing the characteristics of the tested schedules (including the tuned schedule as well as other less-performant schedules) may be generated and included in the training data records, with the corresponding performance metric results being used to determine the labels for the training data records. The metrics stored with a tuning result record may include, for example, latency (the time taken to execute the tuning task using the tuned schedule on the execution environment), throughput (e.g., expressed in metrics such as computations per second or gigaflops per second) of the computations performed in the tuning task, total memory consumed, and/or other types of metrics in different embodiments. In at least some embodiments, one or more indexes may be generated for searching the database, e.g., based on search parameters such as the execution environment, descriptors of the tuning tasks represented in the result records, the framework(s) used, and so on.

The MLCTS may include one or more distributed tuning experiment coordinators implemented using hardware and/or software of one or more computing devices in some embodiments. Such coordinators may be responsible for identifying a pool of execution environments at which the tuning tasks of the experiments are run. Example execution platforms may include, among others, compute instances of a virtualized computing service of a provider network, processors incorporated within small-footprint edge devices (also referred to as Internet-of-things or IoT devices), computing devices located at premises external to the provider network (such as servers or devices located at premises owned or managed by the clients at whose request tuned code is to be provided), and so on.

In at least one embodiment, an MLCTS may include one or more tuning task extractors (also implemented using some combination of software and hardware) which analyze and parse the content of model files (e.g., files comprising the source code and associated configuration settings of the models to be tuned) and identify specific tuning tasks to be run during the distributed tuning experiments. Tasks may be extracted or determined, for example, at the operator level, at the model sub-graph level or at the model level. Such tuning task extractors may also be used to extract tuning tasks from the tuned code requests submitted by clients of the MLCTS in various embodiments; such extracted tasks may then be used to search for matching tuning result records in the database of the MLCTS.

According to some embodiments, as suggested earlier, an MLCTS may be implemented at a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a machine learning service (which may also be referred to as an analytics service) of which the MLTCS is a part. In some cases, the MLCTS may be implemented as a separate service and may not be incorporated within a more general machine learning service. A VCS may also be referred to as an elastic compute service, virtual machines service, computing cloud service, compute engine, and/or cloud compute in various implementations. Programmatic interfaces of the MLCTS may be used by clients, for example, to request tuned code for machine learning models, provide tuning results obtained by the clients (which can be included in the MLCTS database, etc.).

Example System Environment

FIG. 1 illustrates an example system environment in which a network-accessible tuning service that reduces the time and resources expended by clients to obtain efficient code for their machine learning models may be implemented, according to at least some embodiments. As shown, system 100 of FIG. 1 comprises resources and artifacts of a machine learning code tuning service (MLCTS) 102, including for example tuning task generators/extractors 130, distributed tuning coordinators 132, performance prediction model training managers 134, a machine learning (ML) code provision subsystem 136, tuning result database managers 138 and interface handlers 140. Each of these subcomponents may be implemented using one or more computing devices in various embodiments.

The MLCTS 102 may implement a collection of programmatic interfaces 177 in the depicted embodiment, comprising for example a web-based console interface, a set of application programming interfaces (APIs), command-line tools, graphical user interfaces and the like. Such interfaces may be utilized by clients of the MLCTS to submit various types of messages or requests pertaining to the tuning of machine learning models (such as requests to obtain tuned executable code or tuned schedules for all or part of a specified model, preferences regarding auto-tuning frameworks, parameter combinations to be used during distributed tuning experiments, etc.), and receive corresponding responses from the MLCTS. Requests or messages may be transmitted, for example, from a variety of client devices 170 in different embodiments, such as desktops, laptops, mobile devices and the like. The requests may be received by interface handlers 140 in the depicted embodiment. The interface handlers 140 may then transmit internal versions of the requests/messages to other subcomponents of the MLCTS 102, receive responses from the other subcomponents and pass them on to the clients via the programmatic interfaces 177.

The MLCTS 102 may handle tuning-related tasks for models developed using a number of machine learning model frameworks (e.g., TensorFlow, PyTorch and the like), and may utilize a number of machine learning model compilers to prepare the executable code for tuned schedules in the depicted embodiment. The set of supported machine learning frameworks and compilers 120 may grow over time as more machine learning development tools become popular or as new requests for supported tools are received from clients. One or more supported auto-tuning and/or auto-scheduling tools 122 may be employed in various activities of the MLCTS 102 in the depicted embodiment, e.g., to conduct large-scale distributed tuning experiments, to identify candidate schedules for models for which tuned code is requested by clients, and so on. The number of supported code execution environment categories 124, at which the distributed tuning experiments are conducted and for which code is generated using the supported compilers, as well as the supported auto-tuning or auto-scheduling tools/frameworks may also grow over time in various embodiments.

In at least some embodiments, numerous distributed tuning experiments may be orchestrated by distributed tuning coordinators 132 of the MLCTS 102. Such experiments may involve the execution of tuning tasks determined from analysis of descriptors and/or source code of various machine learning models by tuning task generators/extractors 130 in the depicted embodiment. In at least some cases the tuning experiments may be conducted proactively, without receiving corresponding requests from clients, e.g., in anticipation that the results of the tuning experiments may help speed up responses to client-submitted requests for tuned code later. The tuning tasks may be executed at any of a variety of distributed tuning execution environments 150, and records representing the results of the experiments may be stored in a database managed by the tuning result database managers 138 in the depicted embodiment. An individual tuning result record stored in the database may include a number of constituent fields or elements in different embodiments, such as respective representations of (a) a tuning task indicating at least a portion of a machine learning model, (b) a tuned schedule for executing one or more sub-operations of the tuning task at a particular execution environment, (c) a performance result (e.g., latency or throughput) obtained by running executable code corresponding to the tuned schedule at the particular execution environment, (d) the frameworks and/or tools used for the machine learning model and the tuning task, and/or (e) information (e.g., a path or a storage service object identifier) enabling access to a comprehensive set of logs for the tuning experiment(s) in which the tuned schedule was identified.

In addition to the coordination of the distributed tuning experiments, resources of the MLCTS (such as performance prediction model training managers 134) may be used to train one or more performance prediction models in at least some embodiments. At a high level, such a model may be used to predict or estimate, for a given schedule identified for a tuning task and for a given execution environment, a score indicative of one or more performance metrics (e.g., latency, throughput, memory consumption and the like) which would be obtained by executing the schedule at the given execution environment in various embodiments. To train the model, training records may be extracted or generated based at least in part on the comprehensive logs which were generated during earlier distributed tuning experiments in some embodiments. Such logs may include the details of the schedules which were tested in the tuning experiments, and the results which were obtained for each of the schedules. Input features for training the performance prediction models may be derived from the contents of the logs in various embodiments, e.g., by the training managers 134. A given training record may include, for example, respective features representing an execution environment, the parameters/attributes/properties of the schedule for the portion of machine learning model code which was tuned on the execution environment, and one or more result metrics obtained during the tuning. The output performance prediction generated by the model may include, for example, a relative performance score which can be used to rank the predicted performance of the schedule relative to other schedules. Any combination of a variety of machine learning algorithms may be employed for the performance cost model in different embodiments, such as regression models using boosting trees, neural network models and the like. In one implementation, a neural network model which multiple stacks of a building block comprising a gating stream and an encoding stream may be used as the performance prediction model. The gating stream may include a linear component followed by a sigmoid activation component, while the encoding stream may comprise a linear component, followed by a batch normalization component and a "leaky" ReLU (rectified linear unit) activation component.

Clients of the MLCTS may submit programmatic requests for tuned code in the depicted embodiment via programmatic interfaces 177, e.g., indicating the models (or portions of models) for which tuned code is desired. In response to such a code request, components of an ML code provision subsystem 136 may attempt to find a tuning result record in the database of the MLCTS whose tuning task meets a similarity criterion with respect to a tuning task indicated in the code request (or extracted from the code request by a tuning task generator/extractor 130). Any of a variety of similarity detection techniques may be employed in different embodiments, e.g., including exact-match algorithms, cosine distance based algorithms applied to the features of the client's requested tuning task and the representations of the tuning tasks stored in the database, and so on. If such a result record is found, indicating that a tuned schedule suitable for the client has already been identified, executable code corresponding to the tuned schedule indicated in the result record may be provided to the client by the ML code provision subsystem 136 in various embodiments. In at least one embodiment, if requested by the client, the tuned executable code may be deployed to a tuned ML code execution environment indicated by the client.

If the database of the MLCTS does not have a result for a tuning task which is identical to, or very similar to, the tuning task determined from the code request submitted by the client, the performance prediction model may be used to help prepare the response to the client in various embodiments. In at least one embodiment, one of the supported auto-tuning frameworks may be employed to identify a set of candidate schedules which may be worth exploring for the client's tuning task. Representations of such candidate schedules may be provided as input to a performance prediction model, and estimates of the expected performance for individual ones of the candidate schedules may be obtained using the model, without actually running candidate schedules' code on an execution environment. As such, estimates of the performance may be obtained extremely rapidly using the model, without going to the trouble of actually running any of the candidate schedules, which could take a long time and consume a lot of resources. Using the predicted performance results, a small subset of the candidate schedules may be selected for actual experimentation and measurement at the ML code provision subsystem in some embodiments. For example, the count of candidate schedules identified or proposed by the auto-tuning framework may be in the thousands or tens of thousands, while the subset may include only a dozen of the candidates whose predicted performance is the best among the thousands or tens of thousands candidates proposed. Code corresponding to just this small subset of selected schedules may be generated (using the appropriate compiler) at the ML code provision subsystem and run at an execution environment indicated by the client in the code request in the depicted embodiment. The particular schedule (among the small subset tested) which led to the best performance may be selected as the preferred schedule in at least some embodiments, and executable code corresponding to the preferred schedule may be provided to the client in a response to the code request (and/or deployed to a tuned ML code execution environment 152). Additional details pertaining to the operations of various subcomponents of the MLCTS are provided below.

Example Tuning Granularities

Figure 2:
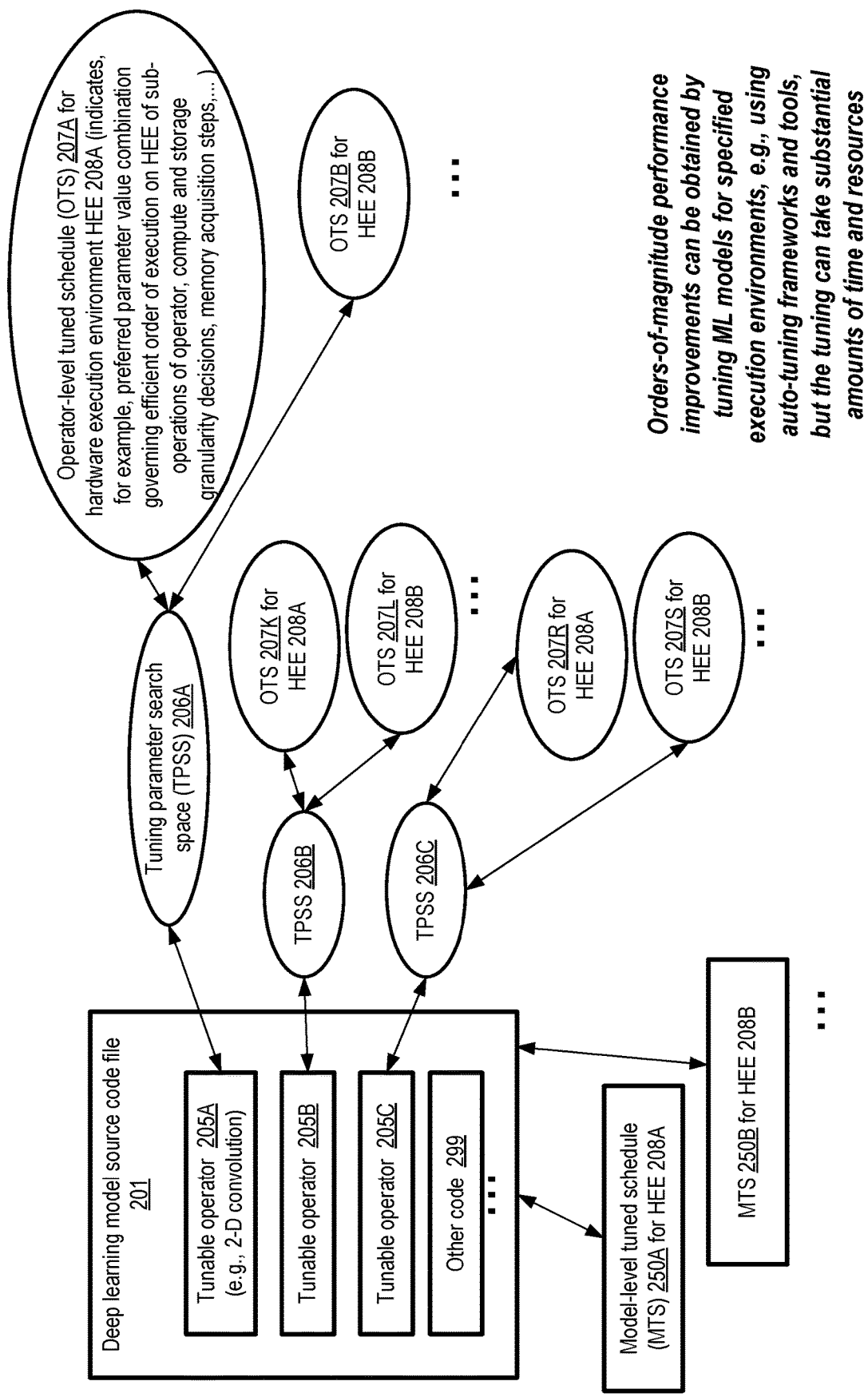
FIG. 2 illustrates example granularities at which machine learning model code may be optimized, according to at least some embodiments.

FIG. 2 illustrates example granularities at which machine learning model code may be optimized, according to at least some embodiments. The source code of a machine learning model, such as a deep learning model, may comprise one or more potentially tunable operators in some embodiments. Individual operators may, for example, involve computations on large, often multi-dimensional vectors or tensors, and the order in which such computations within a given operator are orchestrated or ordered relative to one another may have a significant impact on the time taken to run the model at a given execution environment. In the example scenario shown in FIG. 2, deep learning model source code file 201 includes tunable machine learning operators 205A-205C, as well as other code 299.

The model represented in source code file 201 may be tuned at any of several granularities in different embodiments at a tuning service similar to MLCTS 102 of FIG. 1. In one approach, operator level tuning may be performed, in which individual operators are tuned separately, e.g., independently of one another. A respective tuning parameter search space (TPSS) 206 may be identified, such as TPSS 206A for operator 205A, TPSS 206B for operator 205B, and TPSS 206C for operator 205C, using an auto-tuning framework or tool in at least some embodiments. Using different combinations of parameters, compiled versions of a given operator 205 may be run at one or more execution environments (such as compute instances of a provider network's virtualized computing service, IoT devices, etc.) and performance metrics may be collected from each of the runs.

Each combination of parameters tested may be represented by a respective operator-level schedule, and the schedule which provide the best performance (based on combinations of one or more criteria such as shortest latency and/or highest throughput) on a given hardware execution environment (HEE) may be selected as the operator-level tuned schedule (OTS) 207 for that HEE. For example, OTS 207A may be identified for operator 205A and HEE 208A, OTS 207B may be identified for operator 205A and HEE 208B, OTS 207K may be identified for operator 205B and HEE 208A, OTS 207L may be identified for operator 205B and HEE 208B, OTS 207R may be identified for operator 205C and HEE 208A, OTS 207S may be identified for operator 205C and HEE 208B, and so on. Numerous (e.g., thousands) of runs of a given operator on a given HEE may be performed, e.g., at least partly in parallel with one another in distributed tuning experiments coordinated by the tuning service in some embodiments. A given OTS may indicate, for example, the preferred parameter value combination which led to the best performance among the tests for an operator and an HEE, including for example parameters controlling the order of execution of sub-operations or sub-computations of the operator, the granularity and interleaving of various compute and storage/memory operations, memory acquisition and release steps, tiling parameters, stride parameters, and so on. The HEEs may for example differ from one another in such properties as the amount of data which can be fetched from memory at a time, the sizes of various buffers or registers, and so on, and such architectural differences may impact performance of the operators substantially.

In at least some embodiments, tuning may be performed at an MLCTS at a coarser granularity, instead of separately for different operators. For example, a graph whose nodes correspond to operators may be constructed from the model as a whole, and the operations of the entire graph may be optimized together in tuning experiments. Such model-level tuning (also referred to as model graph-level tuning) results in the identification of model-level tuned schedules (MTSs) 250 for a given model and HEE combination. In the example scenario shown in FIG. 2, MTS 250A is identified for the model represented by file 201 and HEE 208A, while MTS 250B is identified for the same model and HEE 208B. In contrast to operator-level tuning, in some embodiments the model-level tuned schedules may be able to take advantage of relationships and sequencing of the different operators within a model, e.g., by passing partial results from one operator to another before all the results of the first operator become available.

In at least one embodiment, tuning may be performed at an intermediate level between operator-level and model-level tuning. In such an approach, sub-graphs of the model graph (corresponding for example to one or more layers of a deep neural network, which may comprise multiple operators) may be tuned, instead of the whole graph. The decision as to the granularity (or granularities) at which a model or is to be tuned may be made based on a variety of factors in different embodiments, e.g., based on the capabilities of the auto-tuning tool or framework being used, based on the preferences of the model owners (clients of the MLCTS), based on the time and resources available for the tuning runs, and so on. In at least some embodiments, tuning at several different granularities-operator-level, model-level, and model sub-graph-level, may be performed for a given model in distributed tuning experiments coordinated at an MLCTS.

In at least some cases, orders-of-magnitude performance improvements may be achieved by tuning machine learning models for specific execution environments using any of the different granularities. Often the tuning may be conducted using auto-tuning frameworks and tools, which reduces some of the overhead (e.g., of selecting particular combinations of tuning parameters to be tried). However, even when auto-tuning frameworks or tools are employed, the tuning of a given model can take substantial amounts of time and resources.

FIG. 3 illustrates an overview of benefits which may be provided by a machine learning code tuning service to its clients, according to at least some embodiments. Such a service may resolve the problem of excessive time and resources needed for tuning models substantially using the following approach. A database of tuned schedules for popular machine learning models, operators, and hardware execution environments may be pre-populated at a cloud-based tuning service similar to MLCTS 102 of FIG. 1, as indicated in element 330. The tuning of a particular model or operator on a selected set of execution environments may be performed in at least some cases even without receiving a client request to do so; in effect, the tuning service may build up a tuning result knowledge base in preparation for potential future requests which may be submitted by clients. By orchestrating distributed tuning experiments in advance, the turn-around time experienced by clients if/when they request tuned code for a model may be dramatically improved. The database of tuning result records may be grown over time, based for example on detecting that new types of machine learning operators have been proposed, new types of models or algorithms have been developed, or improved execution environments have become available.

In at least some embodiments, clients of the tuning service may submit programmatic requests for additional tuning experiments, specifying models/sub-graphs/operators to be tuned on execution environments of interest to the clients. In response to such tuning experiment requests, the tuning service may launch new tuning experiments and add the results to the database. In one embodiment, a client may submit results of tuning experiments that the client has conducted, and such results may be added to the database, e.g., for sharing with other clients.

When a client of the tuning service submits a request for tuned code corresponding to a model or a portion of a model and a particular hardware execution environment, the database may be searched to determine whether a suitable tuning result is already available for the request. If a tuning result record is found, this may be referred to as a database hit in some embodiments; if such a tuning result record is not found, this may be referred to as a database miss. A pre-existing tuning result record may be considered suitable in various embodiments if conditions such as the following are satisfied: (a) the tuning task (e.g., the operator, sub-graph or model) indicated in the result record meets a similarity criterion with respect to the tuning task indicated by the client and (b) the hardware execution environment used for the tuning result record meets a similarity criterion with respect to the execution environment indicated in the client's request. In some embodiments, the result record's execution environment may have to match the client's desired execution environment exactly for the result record to be considered acceptable. In at least one embodiment, the tuning task indicated in the result record may be considered sufficiently similar to the client's tuning task if the two tasks have identical values for a set of primary properties, but differ in one or more secondary properties (such as the versions of machine learning frameworks used for the model or operator). For such tuning requests which result in database hits, pre-generated tuned code and/or tuned schedules indicated in the tuning result record identified in the database may be provided to the client in real time (e.g., within a few milliseconds or seconds), as indicated in element 340.

When a database miss occurs, i.e., when a pre-existing tuning result record which can immediately be used to respond to a client's tuning request cannot be found, operations summarized in element 350 may be performed at the tuning service in the depicted embodiment. Using a pre-trained performance model, a small set of schedules which are likely to perform close to tuned schedules (which could have been found by conducting large scale experiments) may be selected from a larger set of candidate schedules (e.g., with the larger candidate set being quickly identified using an auto-tuning tool or framework), without actually conducting any tuning experiments. In some cases, a single preferred schedule may be identified from the small set using actual experiments on the targeted hardware execution environment indicated by the client, which may for example take a few seconds or minutes instead of the hours or days it might have taken to complete a full-blown tuning experiment. Executable code corresponding to the preferred schedule, which may be considered "almost-as-good-as-tuned" code, and/or the preferred schedule itself, may be provided to the client in various embodiments. In some embodiments, several of the schedules (or code corresponding to several of the schedules) may be provided to the client if desired. Optionally, in at least some embodiments, full tuning experiments corresponding to the client's request may be conducted asynchronously with respect to the client's request, and the results obtained from such experiments may eventually be added to the database of the tuning service. Using the approach indicated in FIG. 3, the time and resources required to be expended for a client of the tuning service to obtain tuned code for a machine learning model may be substantially reduced, relative to the time and resources which may have been needed to perform large-scale tuning without using the service.

Example Automated Generation of Tuning Tasks

Figure 4:
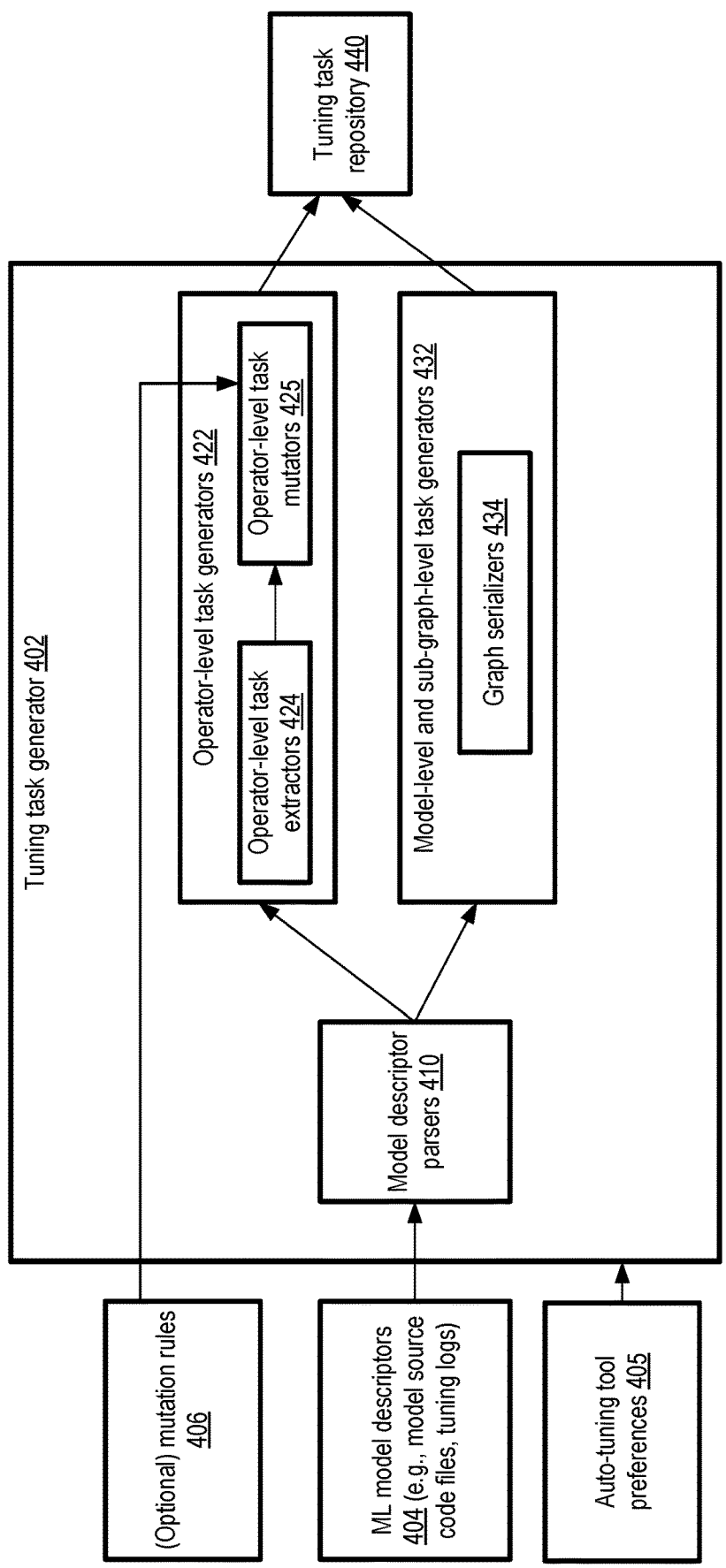
FIG. 4 illustrates examples of the automated generation of tuning tasks at a tuning service, according to at least some embodiments.

As indicated above, a number of distributed tuning experiments or efforts may be conducted at a tuning service to populate a growing database of pre-created tuning result records, with the objective of being able to provide tuned code in real time as often as possible in response to requests from clients. A given distributed tuning experiment may comprise any of several types of tuning tasks at different granularities, each task associated with at least a portion of a machine learning model. In some embodiments source code or descriptors for commonly used deep learning models may be obtained from publicly available model collections (sometimes referred to as "model zoos"), and then analyzed to identify specific tuning tasks which are performed in the tuning experiments. In at least one embodiment, variants of baseline commonly-used models may also be identified, e.g., which use different batch sizes of input data, different numbers of channels or stride values for convolution operators, and so on, and then tuning tasks may be extracted for the variants as well as the baseline versions. FIG. 4 illustrates examples of the automated generation of tuning tasks at a tuning service, according to at least some embodiments.

Tuning task generator 402, implemented at one or more computing devices of a tuning service similar to MLCTS 102 of FIG. 1, may comprise one or more model descriptor parsers 410, operator-level task generators 422 and model-level and sub-graph-level task generators 432 in the depicted embodiment. Machine learning model descriptors 404 (e.g., files containing model source code, and/or contents of tuning logs generated earlier) may be obtained as input by the model descriptor parsers 410. In some embodiments, operator-level task generators 422 may include operator-level task extractors 424 which identify particular operators for which tuning may be beneficial within parsed versions of the models, e.g., using application programming interfaces (APIs) implemented by auto-tuning frameworks. Operator-level task mutators 425 may be used to choose specific combinations of operator parameters to try in various embodiments. In some embodiments, preferences 405 for auto-tuning tools or frameworks to be employed to identify the parameter spaces for the tuning tasks may also be obtained as input by the tuning task generators, e.g., from public web sites or from client-specified web sites. Depending on the auto-tuning framework, the granularity or granularities of the tuning experiments (e.g., operator-level versus model level or sub-graph-level) to be conducted for a given model may be determined in some embodiments. For model-level tasks or sub-graph-level tasks, a serialized representation of the model as a whole or a serialized representation of a sub-graph of the model graph may be prepared by graph serializers 434 and stored in tuning task repository 440 in the depicted embodiment. For operator-level tasks, representations of the tasks (e.g., expressed in JavaScript Object Notation (JSON), YAML or similar languages) may be stored in the tuning task repository in the depicted embodiment. For example, a YAML representation of an operator-level tuning task for a 2-dimensional convolutional operator may include the following:

{args: [[TENSOR, [1, 256, 56, 56], float32], [TENSOR, [128, 256, 1, 1], float32], [1, 1], [0, 0, 0, 0], [1, 1], float32], lib: topi, target: cuda, task_name: conv2d_xyz.cuda}

In the above YAML extract, the first TENSOR element describes the shape and data type of input data of a 2-dimensional convolution operator while the second TENSOR element indicates the shape and data type of a filter. The first [1, 1] element represents a stride, the [0, 0, 0, 0] element represents a padding, the second [1, 1] indicates a dilation, and the subsequent "float32" indicates the output data type. The name selected for the tuning task is "conv2d_xyz.cuda", the "lib" element indicates that the TVM operator inventory (topi) associated with a compiler framework called TVM is being used, and the "target" element indicates that the Compute Unified Device Architecture (CUDA) for running machine learning programs on graphics processing units is to be utilized for the convolution operator.

The representations of the tuning tasks stored in the repository 440 may be used to conduct distributed tuning experiments in a fault-tolerant manner in at least some embodiments as described below in further detail.

In one embodiment, clients of the tuning service may provide optional mutation rules 406 which can be used to determine specific combinations of parameters to be tried for operator-level tasks. Such rules may, for example, be expressed using Python lambda expressions in some implementations. In one such implementation, a client of the tuning service may specify the following example mutation rules applicable to operator-level tuning tasks for 2-dimensional convolution, resulting in 21 parameter combinations (each corresponding to a separate operator-level tuning task) from the seven values for batch size and three values of channel:

Rules:
batch: "lambda b: [1, 3, 4, 7, 8, 12, 16]"
channel: "lambda c: [c, c*2, c*4]"

Example Distributed Tuning Experiments

Figure 5:
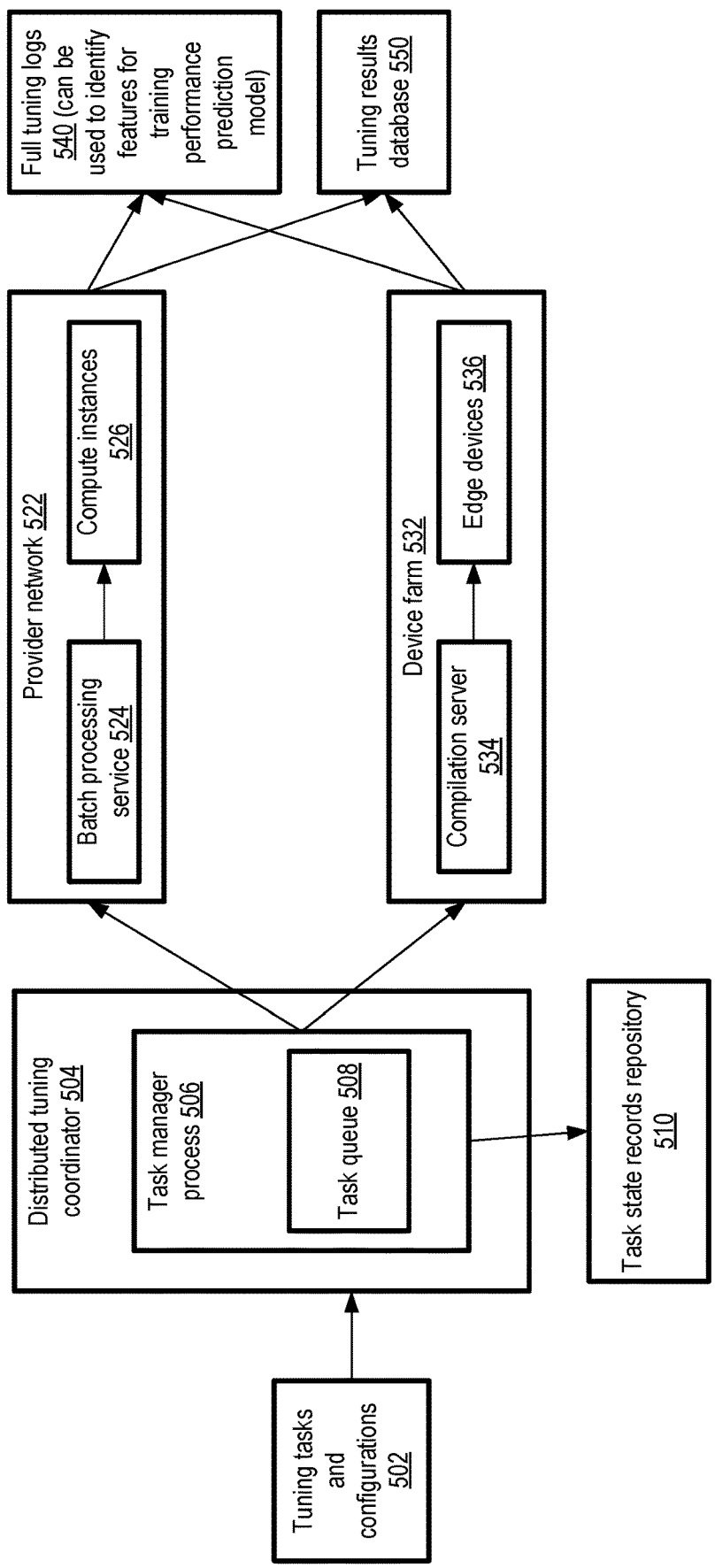
FIG. 5 illustrates examples of distributed tuning experiments which may be conducted by a tuning service, according to at least some embodiments.

FIG. 5 illustrates examples of distributed tuning experiments which may be conducted by a tuning service, according to at least some embodiments. To perform the tuning tasks generated by a tuning task generator similar to that shown in FIG. 4 at scale, a tuning service similar to MLCTS 102 of FIG. 1, a distributed tuning coordinator 504 may populate one or more task queues 508 of a set of task manager processes such as task manager process 506 in the depicted embodiment. Individual elements of the task queue may comprise a representation of a tuning task (e.g., obtained from a repository similar to repository 440 of FIG. 4) and a configuration (e.g., a hardware execution environment (HEE) on which the tuning task is to be run, the number of trials to be conducted for the tuning task to obtain metrics or statistics, etc.). The tuning tasks and configurations 502 may be obtained at least in part from a tuning task repository similar to repository 440 of FIG. 4 in various embodiments. Depending on the configuration information, the tuning manager process may schedule tasks at any combination of a variety of resource types. Some tasks may be scheduled using a batch processing service 524 of a provider network 522, which in turn deploys the tasks to compute instances 526 of a virtualized computing service of the provider network. Other tasks may be scheduled at a device farm 532 comprising a plurality of edge devices 536 (such as processors incorporated within IoT devices). In some embodiments, some tuning experiments which utilize resources at a client network (e.g., at a premise of a client of the tuning service, external to the data centers of a provider network at which the tuning service is implemented) or a vendor of edge devices may be coordinated by a distributed tuning coordinator and/or a task manager of the tuning service.

Upon completion of the tuning task, e.g., after a tuned schedule is identified, a tuning result record comprising the tuned schedule and other details of the task may be stored in the tuning results database, e.g., directly by the resource (e.g., a process or thread at an edge device, compute instance or client-premise resource) at which the task was performed in the depicted embodiment. In embodiments in which such direct storage to the database is implemented, the distributed tuning coordinator may not have to aggregate results and submit them to the database, thus reducing the amount of work needed from the coordinator. In other embodiments, the results may be sent back to the task manager or distributed tuning coordinator, and the task manager or the coordinator may insert them into the database 550.

In at least one embodiment, full tuning logs 540, showing results obtained for parameter combinations other the combination used for the tuned schedule, may be stored at a repository by at least some of the resources used for the tuning experiment. Such tuning logs may be used to identify features included within training records used to train performance prediction models in some embodiments as indicated above, which in turn can be used to quickly respond to client code requests which do not result in hits in the tuning results database.

The distributed tuning coordinator may be implemented in a stateless manner in some embodiments. In such an embodiment, state changes of the tuning tasks (e.g., whether a tuning task has been started at a resource such as a compute instance 526 or an edge device 536, the progress made in the tuning task thus far, the contents of the task queue 508 etc.) may be stored at a task state records repository 510. If the distributed tuning coordinator fails or crashes, a replacement coordinator may be launched, which can resume the tuning experiment using the task state records stored in the repository 510.

In embodiments in which a batch processing service 524 is employed, scalability and reliability of the tuning experiments may be handled at least in part by the batch processing service. The batch processing service may automatically launch compute instances 526 as needed, and schedule tasks on them. If an instance fails before the tuning task assigned to it is complete, the batch processing service can reassign the task to another instance. Log messages generated by the batch processing service (indicating the states of the tasks at the compute instances) may be retrieved by the distributed tuning coordinator and used to update the task state record repository 510 in some embodiments.

In some embodiments, the machine learning models being tuned may be intended to run on lightweight edge devices, such as sensors, smart home devices, voice-driven personal assistant devices, and/or other types of IoT devices. In one embodiment, a pool of such edge devices may be set up and managed by the tuning service, or by another service of a provider network of which the MLCTS is a part. In other embodiments, a client may contribute edge devices for distributed tuning experiments. Since computation resources of the lightweight edge devices tend to be relatively limited, a cross-compilation technique may be employed in some embodiments for model deployment on edge devices. First, the deep learning models (or portions of the models) being tuned may be compiled on a compilation server 534, e.g., a server which has greater computation resources than individual edge devices 536. The compiled binary code may then be uploaded to the edge devices for deployment. This approach simplifies the configuration and setup activities required in various embodiments, as only a relatively lightweight device runtime may be required, and a remote procedure call (RPC) server may be set up at the distributed tuning coordinator to communicate with the edge devices. In at least some embodiments, each edge device may request a task from the distributed tuning coordinator when the edge device is ready to start a new task; in some cases, the edge devices may be behind a firewall, so it may be more efficient for the edge devices to request tasks actively instead of the coordinator pushing tasks to the edge devices on its own initiative. New edge devices may be added to a device farm 532, e.g., by clients of the tuning service, or existing edge devices can be replaced/substituted, without updating or informing the coordinator in some embodiments. An RPC server at the coordinator may keep track of connections with the edge devices in various embodiments; detections of connections and disconnections may be used to trigger callbacks which update the state information about the edge device tuning tasks at the coordinator. The task manager at the distributed tuning coordinator may recycle a task from a disconnected or failed edge device if/when a connected edge device with the appropriate configuration becomes available.

Numerous (e.g., thousands of) compute instances and/or edge devices may be available for use by a tuning service of a provider network in some embodiments. As a result, depending on the number of outstanding tasks ready for execution and the number of configurations to be tested, the approach illustrated in FIG. 5 may enable hundreds or thousands of tuning tasks to be performed in parallel in such embodiments, thereby substantially reducing the total time taken to obtain tuned schedules for the tasks compared to scenarios in which the tasks are executed serially or using a small set of resources. In at least some embodiments, clients of the tuning service, vendors/providers of the execution environments used for running the models and/or other third parties may contribute to the tuning results database, e.g., by submitting tuning results obtained in experiments they have conducted. In some cases these types of externally-generated tuning result records may have been obtained from execution environments to which the MLCTS does not have direct access, e.g., including servers or devices located at vendors' sites or at client premises. The tuning service may implement programmatic interfaces for submitting such contributions in some embodiments.

Example Data Models

Figure 6:
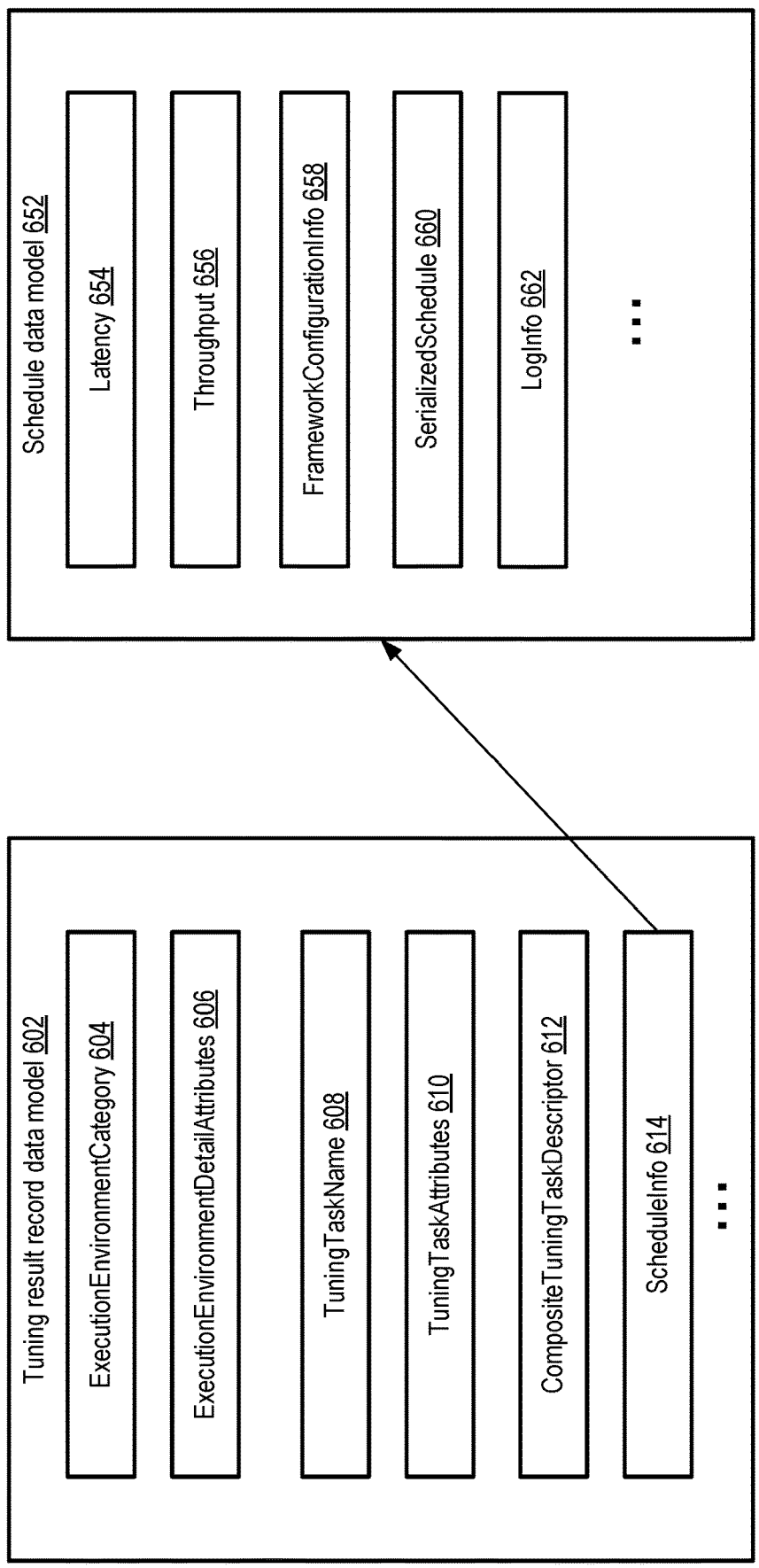
FIG. 6 illustrates examples of data models which may be used for a database of machine learning tuning results at a tuning service, according to at least some embodiments.

As a tuning service similar to MLCTS 102 of FIG. 1, a heterogeneous collection of tuning experiments may be conducted, using compilers for a variety of hardware execution environments, different auto-tuning and machine learning frameworks, different machine learning model languages, and so on. Results from different tasks may contain values for different sets of attributes in some cases. A set of data models and data stores capable of representing the tuning results from diverse sources in a common, standardized manner, and enabling fast searches in response to requests for tuned code, may be utilized in various embodiments. FIG. 6 illustrates examples of data models which may be used for a database of machine learning tuning results at a tuning service, according to at least some embodiments.

A tuning result record data model 602 which may be employed in some embodiments may include some combination of the following fields or attributes shown in FIG. 6. An ExecutionEnvironmentCategory field 604 may for example comprise a string indicating a type of hardware processor, identified by a vendor name, a hardware architecture or instruction set name, an indication whether the processor is classified as a CPU, a GPU, a customized machine-learning processor, and so on. Additional details about the execution environment, such as a chipset identifier or chip generation identifier, the main memory size available, etc., may be represented using ExecutionEnvironmentDetailAttributes field 606, in some embodiments. The name of the tuning task (which may be a string automatically generated by a tuning task generator/extractor of the kind discussed above, or supplied by a client) whose result is stored in the record may be indicated in the TuningTaskName field 608, and values of various attributes of the tuning task may be indicated in TuningTaskAttributes field 610. The contents of the TuningTaskName and TuningTaskAttributes fields may be combined (e.g., via concatenation or some other aggregation technique) to form a CompositeTuningTaskDescriptor field 612 in some embodiments. Pointers to one or more records (constructed in accordance with the schedule data model 652) containing one or more tuned schedules identified for the tuning task may be stored in ScheduleInfo field 614 in some embodiments. In some implementations, for example, respective tuned schedules may be indicated for different framework versions for the same underlying tuning task.

A schedule data model 652 may comprise some combination of the following fields or attributes shown in FIG. 6 in some embodiments. Performance metrics such as latency 654 and/or throughput 656 measured for the execution of the schedule may be included as fields. Throughput may be a more size-independent metric than latency for some kinds of tuning tasks. For example, if a matrix multiplication of an N1×N2 matrix and an N2×N3 matrix takes t1 milliseconds on the execution environment selected, the latency for the task would be t1 milliseconds, while the throughput may be expressed as the number of multiplications and/or additions performed per second (which would be less dependent on the sizes of the matrices). The FrameworkConfigurationInfo field 658 may provide information on the types of auto-tuning and/or machine learning frameworks or tools such as compilers which were used, such as framework/tool name, version number and the like. A serialized representation of the schedule itself (e.g., specific values of parameters whose use led to the measured latency and throughput) may be stored in a SerializedSchedule field 660 in some embodiments. Information about the logs of the tuning experiment in which the schedule was identified may be indicated in the LogInfo field 662 in the depicted embodiment. Note that not all the fields shown in FIG. 6 may necessarily be populated in a given result record in some embodiments. Indexes may be created at the data store for some or all of the fields in some embodiments, enabling tuning result records to be searched by various combinations of the fields. The tuning result record and schedule data models used in some embodiments may differ in one or more fields from those shown in FIG. 6.

In one embodiment, contents of a tuned schedule which may be stored in the tuning results database of a tuning service may comprise elements such as the following. Annotations explaining the contents are shown after the "#" character. The values of the schedule parameters such as "tile_f", "tile_y", etc., were found to provide the latency indicated in the result field (the smallest latency among those measured in the set of tests conducted in an experiment), and as such represent the values which should preferably be used to execute the convolution operator on the hardware execution environment targeted.

```
----Start example tuned schedule --------------------------------
{"input": ["HEE=<HEEname>", # The hardware execution environment
name.
   "Conv2D",     # The operator name (2-dimensional convolution)
   [["TENSOR", [1, 512, 7, 7], "float32"],  # Shape and data type of
   input data.
   ["TENSOR", [2048, 512, 1, 1], "float32"], # Shape and data type of
   filter.
   [1, 1],     # Stride.
   [0, 0, 0, 0],  # Padding.
   [1, 1],     # Dilation.
   "float32"]],  # Output data type.
"config": {"index": 323647, # An identifier generated automatically
# the following parameter values of the 2-dimensional convolution
algorithm
# were found to perform best among those tested;
   "entity": [["tile_f", "sp", [-1, 2, 32, 1]],  # Schedule parameter.
      ["tile_y", "sp", [-1, 7, 1, 1]],   # Schedule parameter.
      ["tile_x", "sp", [-1, 1, 7, 1]],   # Schedule parameter.
      ["tile_rc", "sp", [-1, 32]],      # Schedule parameter.
      ["tile_ry", "sp", [-1, 1, 1]],    # Schedule parameter.
```

-continued

```
    ["tile_rx", "sp", [-1, 1]],      # Schedule parameter.
    ["auto_unroll_max_step", "ot", 1500], # Schedule parameter.
    ["unroll_explicit", "ot", 1]]},   # Schedule parameter.
 "result": [[8.729893e-05], # The measured latency (in seconds).
    0,              # Error code (0 means no error).
    1.899636,     # Total elapsed time, including compilation and
    measurement.
    1595917836.7559683],  # Timestamp when the results were
    obtained.
 "version": 0.2,      # The schedule format version.
 "compiler_version": "0.7.dev1" # The used deep learning compiler
 (e.g., TVM) version.
}
----End example tuned schedule --------------------------------
```

Example Code Provision Subsystem

Figure 7:
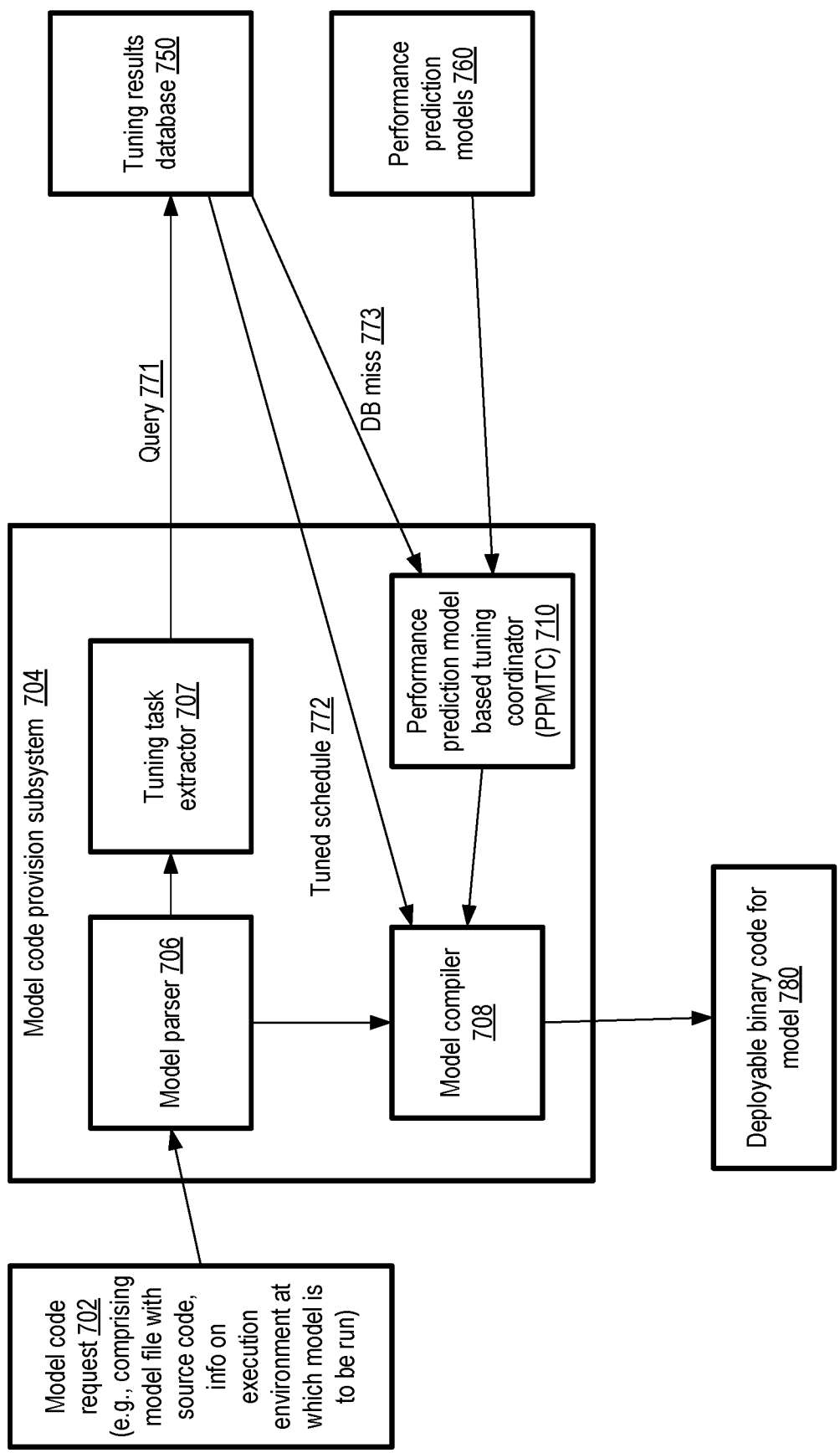
FIG. 7 illustrates example components of a code provision subsystem of a tuning service, according to at least some embodiments.

FIG. 7 illustrates example components of a code provision subsystem of a tuning service, according to at least some embodiments. Such a subsystem may be utilized to provide rapid responses to programmatic requests for tuned code from clients of a tuning service similar to MLCTS 102 of FIG. 1 in various embodiments. A model code request 702, comprising for example one or more files containing at least a portion of source code for a model to be tuned, may be received at the tuning service in the depicted embodiment. The request may also indicate a targeted hardware execution environment for the model in various embodiments—e.g., a category of a compute instance of a virtualized computing service at which the tuned code for the model is to be run, a type of edge device at which the tuned code for the model is to be run, etc. In at least one embodiment, an indication of a preferred auto-tuning framework or tool which could be used to tune the model may be indicated by the client. In some embodiments, the tuning service may be able to infer or deduce an auto-tuning framework or tool which would be suitable for the model, e.g., based on the type of the model, the kinds of operators included in the model, and/or records of the use of auto-tuning frameworks or tools for similar models.

A model parser 706 of the model code provision subsystem 704 may analyze the model code request and provide a transformed/parsed representation (e.g., a graph of operators of the model) to a tuning task extractor 707, similar in functionality to tuning task generator 402 of FIG. 4. The tuning task extractor 707 may identify one or more tuning tasks that could be conducted for the model indicated in the request 702, and for which tuning results may potentially already be available in tuning results database 750. With respect to each tuning task extracted/determined from the client's request, a respective query 771 may be sent to the tuning results database 750 to determine if a result (including a tuned schedule) for a sufficiently similar tuning task is already present in the database in the depicted embodiment. The parameters of the query may, for example, include the targeted execution environment, the name of the operator(s), representations of the tuning task and its attributes and/or a composite tuning task descriptor similar to that discussed in the context of FIG. 6 in some embodiments. At the tuning results database 750, indexes may have been created for some or all of the attributes of tuning result records, and such indexes may be used to quickly identify whether a tuning result record which matches the client's request (i.e. has a tuned schedule for the tuning task indicated by the client's request, or for a very similar tuning task, conducted on the execution environment indicated in the request) can be found.

If a database hit occurs, i.e., if a tuning result record for a matching or sufficiently similar tuning task is present in the tuning results database, the tuned schedule 772 indicated in the tuning result record may be provided to a model compiler 708 in the depicted embodiment. Deployable binary code for the model 780, generated in accordance with the tuned schedule, may be produced by the compiler 708 and provided to the client in various embodiments.

If no appropriate tuning result record can be found in the tuning results database 750, an indication of a database miss 773 may be sent to the model code provision subsystem 704, e.g., to a performance prediction model-based tuning coordinator (PPMTC) 710 of the model code provision subsystem 704 of the tuning service in the depicted embodiment. The PPMTC may utilize an auto-tuning tool or framework to identify a set of candidate schedules (e.g., comprising hundreds or thousands of schedules) which could potentially be evaluated for the tuning task being considered in some embodiments. One or more pre-trained performance prediction models 760 may then be executed, with the candidate schedules provided as input, to quickly obtain estimates of the performance which could be achieved from the candidate schedules. Note that executable code for the candidate schedules may not actually be run at the execution environment of interest at this stage, as would be the case if full-blown tuning experiments were to be conducted in response to the client request. Instead, the performance prediction models, which may have been trained using information extracted from the logs of actual distributed tuning experiments conducted earlier at the tuning service, may be used to determine the relative performance to be expected from the candidate schedules.

Based on the predicted performance, results obtained from the models, a small subset of the candidate schedules may be selected in some embodiments for actual execution and measurement. For example, if there were 10,000 candidate schedules, 5 or 10 of the schedules which are predicted to provide better performance than the remaining 9,990 or 9,995 may be selected for measurement by the PPMTC 710 in one implementation. The actual measurements may be performed, for example, to ensure that potential minor inaccuracies in the performance prediction model can be compensated for, by actually trying out several schedules instead of immediately using just the single schedule which was assigned the best score by the model. The exact number of candidates selected for measurement may be a tunable parameter whose value is selected by the tuning service in some embodiments. In one embodiment, the client may indicate a preferred number of schedules for which actual measurements are to be conducted on the client's behalf. The PPMTC may conduct a distributed tuning experiment in which the actual performance of the small number of selected schedules is determined in some embodiments. In other embodiments, the PPMTC may make use of a distributed tuning coordinator similar to that discussed in the context of FIG. 5 to obtain the results for the selected schedules. The total time required to run the tests for the small subset of schedules may be on the order of a few seconds or minutes in at least some cases, which is much shorter than the time required for a full-blown distributed tuning experiment. A single preferred schedule may be identified based on the results of the tests, and deployable binary code corresponding to that preferred schedule may be provided to the client in some embodiments. In some cases, the full-blown distributed tuning experiment may be initiated as an asynchronous activity with respect to the client's request and the corresponding response in the case of a database miss, and results of the full-blown distributed tuning experiment may later be added to the tuning results database 750.

Example Programmatic Interactions

Figure 8:
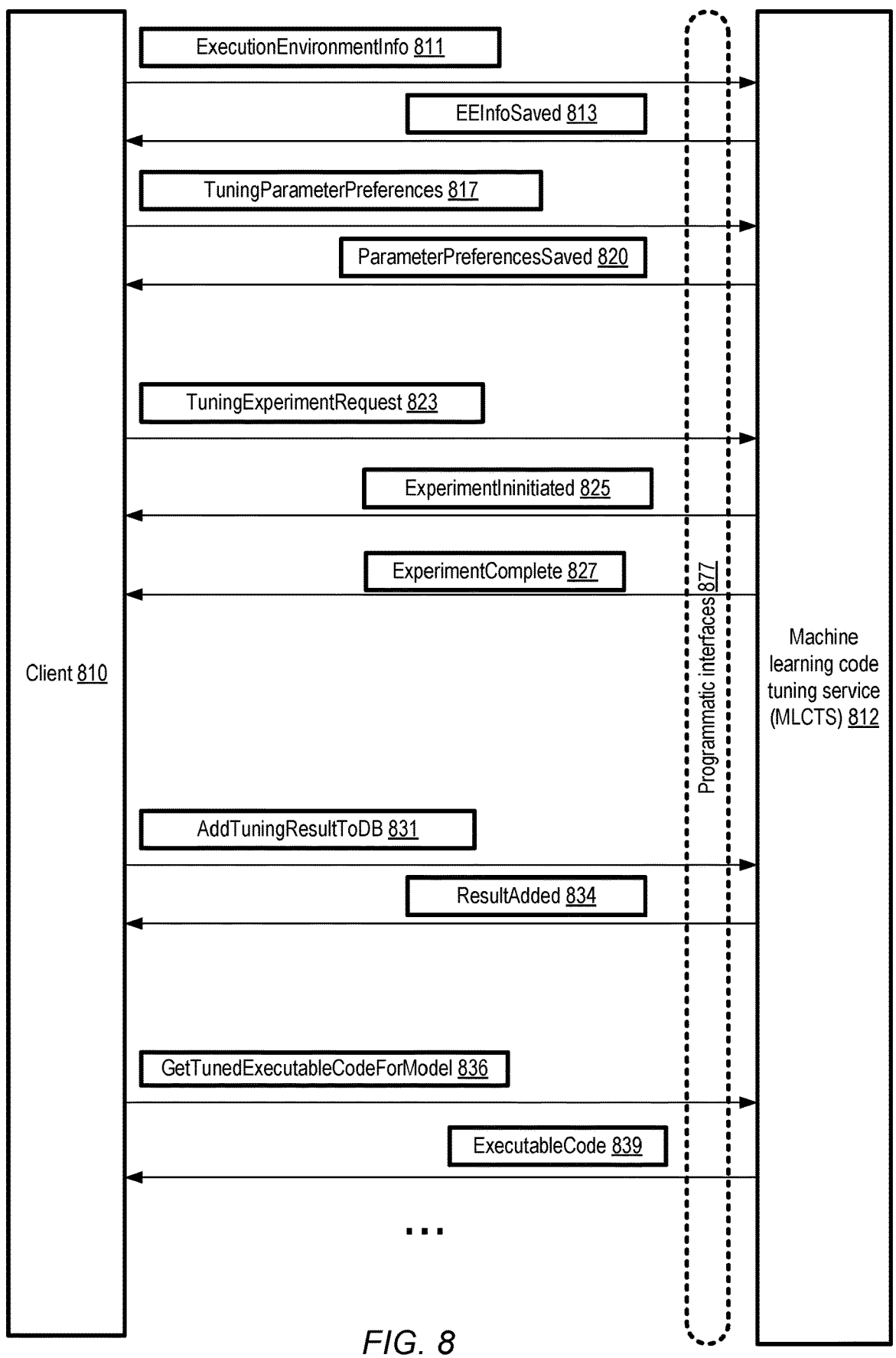
FIG. 8 illustrates example programmatic interactions between clients and a code tuning service, according to at least some embodiments.

In some embodiments, clients may provide guidance about various aspects of tuning-related activities to be performed on their behalf at a tuning service using programmatic interfaces. FIG. 8 illustrates example programmatic interactions between clients and a code tuning service, according to at least some embodiments. In the depicted embodiment, a machine learning code tuning service 812, similar in features and functionality to MLCTS 102 of FIG. 1, may implement a set of programmatic interfaces 877 for client interactions. Programmatic interfaces 877 may include web-based consoles, a set of APIs, command-line tools, graphical user interfaces and the like in different embodiments.

A client 810 may submit an ExecutionEnvironmentInfo message 811 via the programmatic interfaces 877 to the MLCTS 812 in the depicted embodiment, providing information about execution environments which the client intends to use for machine learning models. The information may be saved at a repository of the MLCTS 812, and an EEInfoSaved message 813 may be sent as an acknowledgement to the client in some embodiments. Information about the execution environments may be used by the MLCTS, for example, to expand the pool of resources it uses for distributed tuning experiments of the kind described earlier. In some embodiments, the client may enable tuning experiments to be run at execution environments owned/managed by the client, e.g., at premises external to the data centers of the provider network at which the MLCTS is implemented. Information about such external resources usable by the MLCTS may be provided via ExecutionEnvironmentInfo messages 811 in such embodiments.

For some types of tuning experiments, clients may provide guidance about the parameter space to be searched, e.g., by indicating ranges of values of different parameters in one or more TuningParameterPreferences messages 817. Such preferences may be used to identify the specific combinations of parameters for which measurements are to be obtained on specified execution environments. In some cases, the preferences may be specified using mutation rules of the kind discussed in the context of FIG. 4. The client's preferences may be stored at the MLCTS 812, and a ParameterPreferencesSaved message 820 may be sent to the client in some embodiments.

In many cases, as discussed earlier, distributed tuning experiments may be conducted at an MLCTS pro-actively, without explicit requests from clients. In the embodiment depicted in FIG. 8, a client 810 may also submit requests for tuning experiments, e.g., in the form of TuningExperimentRequest messages 823 indicating the particular tuning tasks to be conducted (e.g., using a specified auto-tuning tool or framework), the execution environments to be used, and so on. An ExperimentInitiated message 825 may be sent to the client to indicate that the requested experiments have been begun by the MLCTS. In some embodiments, an ExperimentComplete message 827, which may also include tuned schedules identified for the requested experiment(s), may be sent to the client when the experiments have concluded.

According to some embodiments, a client may provide tuning results, for experiments conducted by the client, via programmatic interfaces 877 to an MLCTS for inclusion in the MLCTS's database. Such results may be submitted using AddTuningResultToDB messages 831 in the depicted embodiment. By providing such results, clients may in effect share their acquired knowledge about how best to run various machine learning models with other clients of the MLCTS. The results provided may be stored in the database, and a ResultAdded message 834 may be sent to the client in one embodiment. In at least one embodiment, third parties such as vendors/suppliers of hardware execution environments used for machine learning may also or instead contribute tuning results obtained in their own tuning experiments to the database of the MLCTS.

A GetTunedExecutableCodeForModel request 836 may be submitted by a client to obtain executable code of a tuned schedule identified for at least a portion of a specified model by the MLCTS in various embodiments. The MLCTS's model code provision subsystem may identify a tuned schedule for the model, e.g., using techniques similar to those described in the context of FIG. 7, and compiled code corresponding to the tuned schedule may be provided in one or more ExecutableCode messages 839. In at least one embodiment, in addition to or instead of executable code, the client may request that a tuned schedule be provided, in which case a representation of a tuned schedule identified for the client's request may be sent to the client. In some embodiments, a client may request that the MLCTS deploy the executable code for a tuned schedule to one or more execution environments indicated by the client, and the MLCTS may transmit the executable code to the execution environments. It is noted that in at least some embodiments, one or more programmatic interactions other than those shown in FIG. 8 may be supported by an MLCTS, and/or some of the interactions shown in FIG. 8 may not be supported.

Example Provider Network Environment

Figure 9:
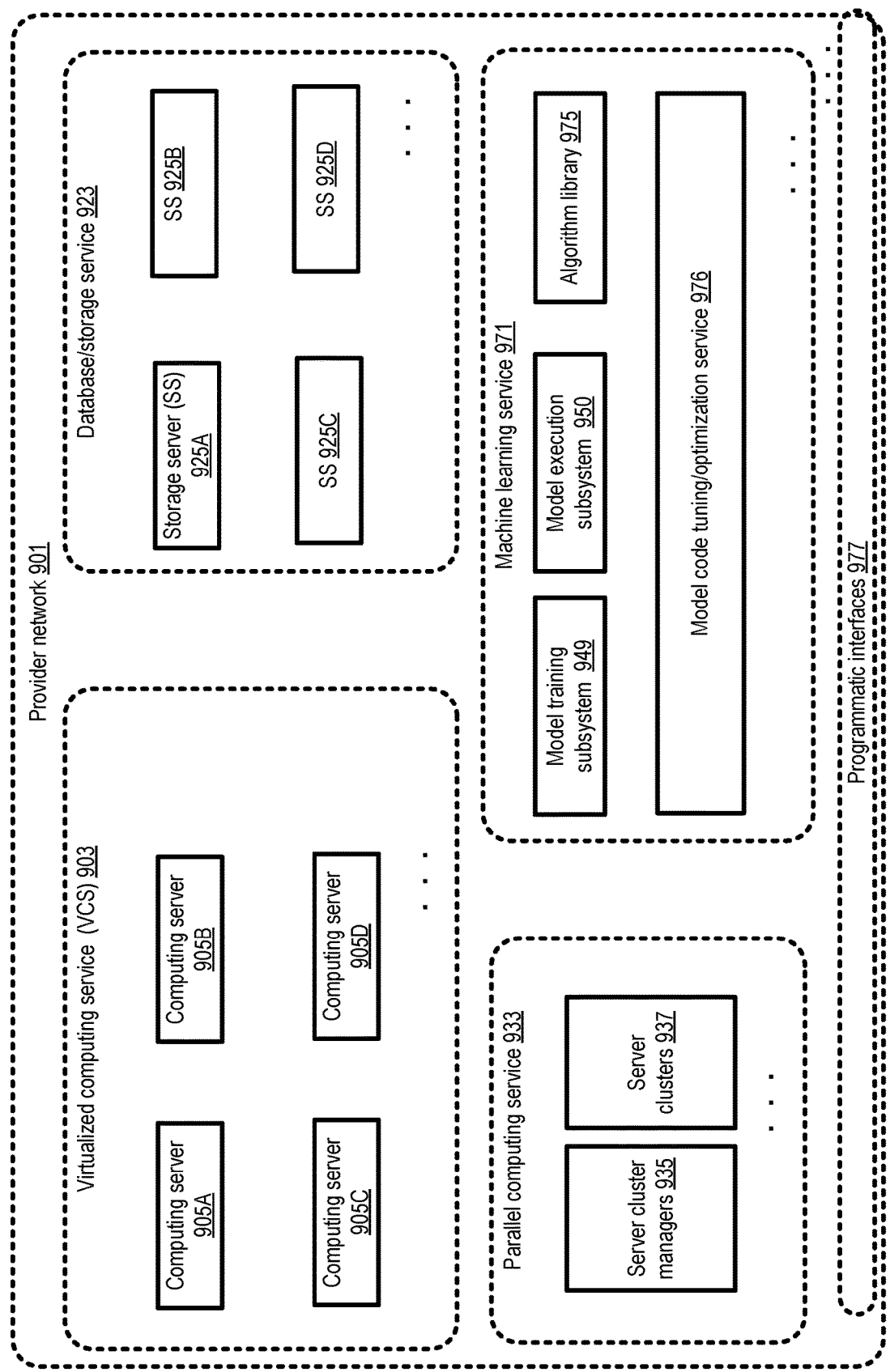
FIG. 9 illustrates an example provider network environment at which a code tuning service for machine learning models may be implemented, according to at least some embodiments.

As mentioned earlier, a machine learning code tuning service similar to that described above may be implemented at a provider network in some embodiments. FIG. 9 illustrates an example provider network environment at which a code tuning service for machine learning models may be implemented, according to at least some embodiments. In the depicted embodiment, provider network 901 may comprise resources used to implement a plurality of services, including for example a virtualized computing service (VCS) 903, a database/storage service 923, and a parallel computing service 933 as well as a machine learning service 971 within which a model code tuning/optimization service 976 may be run. The machine learning service 971, which may also be referred to as an analytics service or an artificial intelligence service, may also comprise algorithm library 975, model training subsystem 949 at which various types of models (including performance prediction models of the kind discussed earlier, as well as other types of machine learning models) may be trained and re-trained using algorithms from library 975, as well as model execution subsystem 950 at which the models' execution or orchestrated after training is complete. In some embodiments, the machine learning service 971 may include special-purpose execution servers (e.g., servers comprising chipsets developed specifically for machine learning tasks). The parallel computing service 933 may include various server clusters 937, each comprising a plurality of servers, on which parallelizable workloads may be distributed by a set of server cluster managers 935 in the depicted embodiment. Some of the algorithms implemented at the machine learning service 971 may be parallelizable, and may utilize the server clusters 937 in at least some embodiments. In at least one embodiment, the provider network 901 may include a software container management service which may be employed to create and store container images to be used for machine learning.

Components of a given service may utilize components of other services in the depicted embodiment—e.g., for some machine learning service tasks (including distributed training experiments of the kind discussed earlier), virtual machines implemented at computing servers such as 905A-905D of the virtualized computing service 903 may be used, server clusters 937 and/or cluster managers 935 may be utilized for parallelizable computations of the machine learning service, input data, metrics and/or output produced at the machine learning service may be stored at storage servers 925 (e.g., 925A-925D) of storage service 923, and so on. In some embodiments, the tuning logs whose contents are used to generate training input for performance prediction models may be stored at the storage servers 925. Individual ones of the services shown in FIG. 9 may implement a respective set of programmatic interfaces 977 which can be used by external and/or internal clients (where the internal clients may comprise components of other services) in the depicted embodiment.

Methods for Providing Tuned Machine Learning Code

Figure 10:
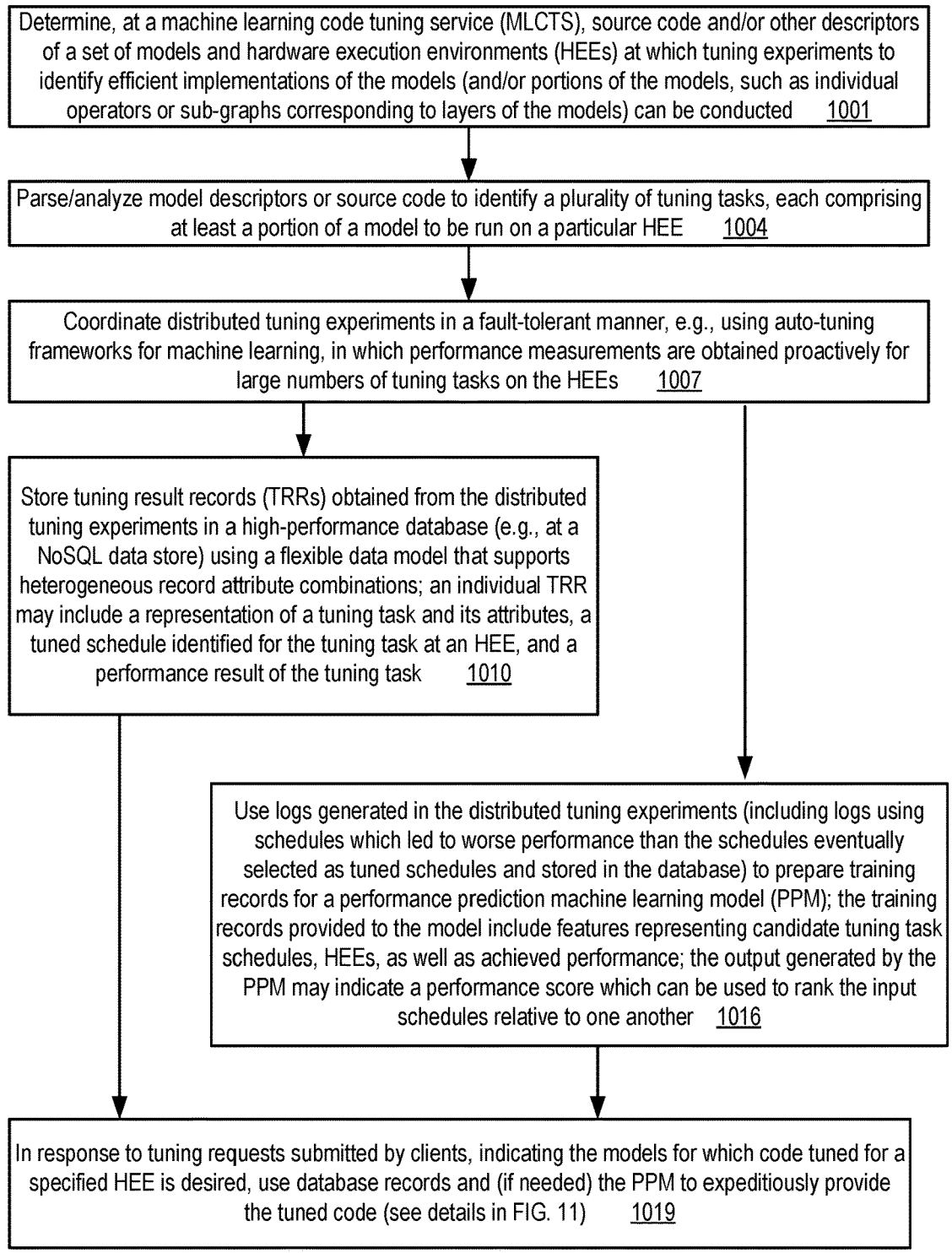
FIG. 10 is a flow diagram illustrating aspects of operations that may be performed at a machine learning code tuning service to populate a database of tuning result records and train a performance prediction model for tuning tasks, according to at least some embodiments.

FIG. 10 is a flow diagram illustrating aspects of operations that may be performed at a machine learning code tuning service to populate a database of tuning result records and train a performance prediction model for tuning tasks, according to at least some embodiments. As shown in element 1001, source code and/or other descriptors for a set of machine learning models and hardware execution environments (HEEs) at which tuning experiments are to be conducted may be determined at a network-accessible machine learning code tuning service (MLCTS) similar to MLCTS 102 of FIG. 1. The tuning experiments may be performed to identify efficient implementations of the models or portions of the models (such as individual machine learning operators including convolution, computation units such as matrix multiplications, sub-graphs of operators corresponding to layers of the models) on the targeted hardware environments, as in general the performance achieved may differ substantially for the same executable code from one hardware environment to another. Models and hardware execution environments that are likely to be popular, e.g., as deduced based on the technical literature or documentation available for various problem domains for which machine learning is commonly used may be selected in some embodiments for tuning. Model source code and information about the execution environments may be obtained from a variety of sources in different embodiments, such as publicly-accessible model collections (sometimes referred to as model "zoos"), hardware vendors, academic institutions, and/or clients of the MLCTS.

The model descriptors and/or source code may be parsed and analyzed at the MLCTS to identify specific tuning tasks which are to be run in various embodiments, each comprising at least a portion of a model to be run on a particular HEE and a set of parameters or attribute values (element 1004). In at least some embodiments, auto-tuning frameworks or tools may be employed to extract/generate the tasks.

A number of distributed tuning experiments may be conducted in various embodiments (element 1007). In a given distributed tuning experiment, several different tests involving the execution of compiled code for the tuning task may be run, e.g., at least partly in parallel, at respective HEE instances. Consider one example scenario in which combinations of three parameters P1, P2 and P3 are to be tried at a total of two hardware execution environments HEE1 and HEE2 for a given portion of code C1 of a machine learning model. If P1 can be assigned any of four values, P2 can be assigned any of four values and P3 can be assigned any of eight values, the total number of tuning tests to be conducted (assuming an exhaustive search of the parameter space is to be conducted) would be 128 per HEE. If 128 instances of HEE1 were available, and if 128 instances of HEE2 were available, all 256 tuning tests may be conducted in parallel (or at least partly in parallel, depending on how long the execution of C1 takes on each HEE). The set of parameters to be tried for a given distributed tuning experiment may be chosen at the MLCTS based on a variety of factors in some embodiments, such as heuristics based on input vector/tensor sizes or shapes, analysis of published performance results of the family of models being tuned, tuning parameter combination preferences indicated by clients, and so on. The distributed tuning results may be coordinated using resources of the MLCTS in various embodiments. The HEEs used in the tuning experiments may include, among others, various types of compute instances implemented at a provider network's virtualized computing service, farms of small-footprint edge devices (e.g., including processors incorporated within IoT devices), and so on. The experiments may be run in such a way that failures at the HEEs can be recovered from easily, e.g., using the fault tolerance techniques discussed earlier in the context of FIG. 5.

Results obtained from the distributed tuning experiments may be stored in the form of tuning result records (TRRs) in a high performance database (e.g., at a NoSQL data store of a provider network storage service) (element 1010) in the depicted embodiment. A flexible data model that supports the storage of result records which differ from one another in the combinations of attributes or columns for which data is included (i.e., records with flexible rather than rigid schemas) may be used in various embodiments, such as the data models discussed earlier. An individual TRR may include a representation of a tuning task and its attributes (such as parameter values), a tuned schedule indicating at least an ordering of sub-operations of the tuning task relative to one another, and one or more performance results (e.g., latency and/or throughput) achieved in the depicted embodiment.

Logs generated in the distributed tuning experiments, which include performance results obtained as various parameter combinations are tried for a given unit of machine learning code, may be used to prepare training records for one or more performance prediction models (PPMs) in some embodiments (element 1016). Note that while only the best-performing schedule for a given task, from among numerous schedules which were tried, may be stored as a tuned schedule in a TRR, the logs may comprise a more complete representation, including the results obtained for schedules which were not selected as the tuned or best schedules. Since all but one of the numerous schedules tried for a given task would not be chosen as the tuned or best schedule, the logs may provide a lot more information about the impact of various parameters on performance at the different HEEs. A data pre-processor that extracts schedule parameter names, parameter values, performance results and the like from the logs may be employed to derive training examples from the logs in some embodiments. In at least some embodiments, the raw performance results (e.g., expressed in seconds for latency, or computations per second for throughput) may be normalized (e.g., converted into real numbers between −1.0 and 1.0) in some embodiments to prepare the training data. A performance prediction model may, for a given input comprising features indicative of a schedule and an HEE, produce output indicating a predicted performance score in various embodiments, so that different schedules can be ranked relative to one another. As such, in some embodiments a PPM may not necessarily predict absolute performance results. In other embodiments, PPMs which predict absolute performance may be used. Any of a variety of machine learning algorithms may be used for the PPMs in different embodiments, such as neural networks, boosting tree based models, and the like. In one embodiment, several different PPMS may be used in combination, such as a boosting-tree-based regression model that minimizes root-mean-square error between predictions and ground-truth performance results, a boosting-tree-based model that minimizes a list-wise ranking objective, and/or a neural network model that minimizes mean-squared-error.

Populating the database of TRRs, and training of one or more PPMs, may be performed on an ongoing basis at the MLCTS in various embodiments. More distributed experiments may be run as new ML algorithms, operators and HEEs become available, so the number of TRRs in the database may increase over time. The PPMs may be re-trained as more logs become available. In response to tuning requests (e.g., requests for tuned code) received from MLCTS clients, as shown in element 1019, indicating the models or model subsets for which tuned code is desired, the database TRRs and (if needed) the PPM(s) may be employed to expeditiously provide tuned code in various embodiments. Details of the manner in which tuning requests may be fulfilled in some embodiments are provided in FIG. 11.

Figure 11:
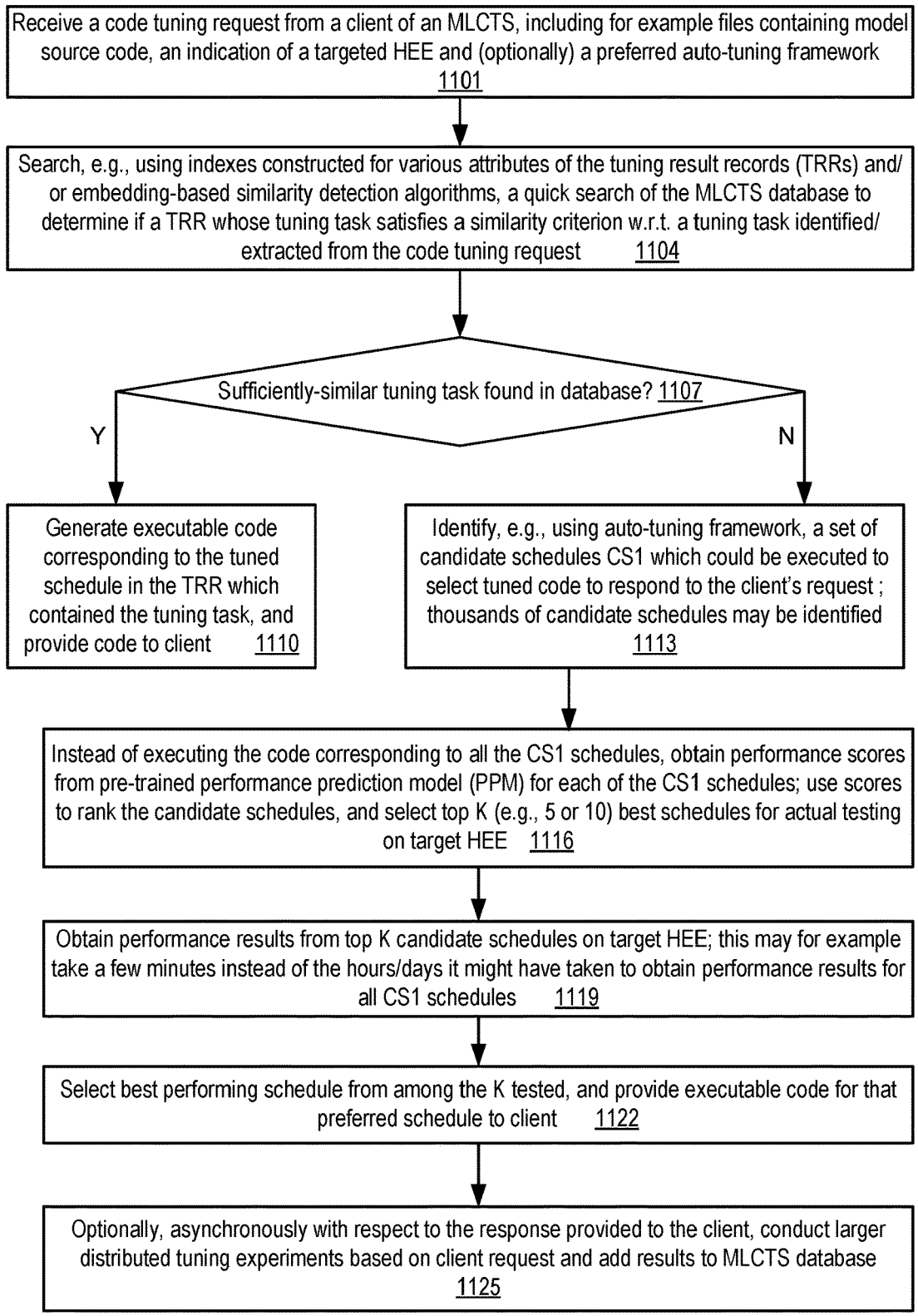
FIG. 11 is a flow diagram illustrating aspects of operations that may be performed at a machine learning code tuning service to respond to code tuning requests from clients, according to at least some embodiments.

FIG. 11 is a flow diagram illustrating aspects of operations that may be performed at a machine learning code tuning service to respond to code tuning requests from clients, according to at least some embodiments. A code tuning request may be received, e.g., via programmatic interfaces of an MLCTS similar in functionality to MLCTS 102 of FIG. 1 (element 1101). The request may for example include or provide a pointer to one or more files containing ML model source code, an indication of a targeted HEE and (optionally) a preferred auto-tuning framework to be employed in various embodiments. In at least some embodiments, if a client does not indicate a preferred auto-tuning framework from among the supported auto-tuning frameworks of the MLCTS, a component of the MLCTS may automatically select an auto-tuning framework for the client's request, e.g., based on heuristics, an analysis of the model source code and/or the problem domain addressed by the model for which tuned code is desired.

One or more tuning tasks may be generated/extracted from the client request, e.g., using similar techniques as those used to extract tuning tasks from model source files for the distributed tuning experiments discussed in the context of FIG. 10 and FIG. 4. In some cases, the auto-tuning framework may be used to identify tuning tasks. The MLCTS database may be searched quickly to determine if a TRR whose tuning task meets a similarity criterion with respect to a task identified from the tuning request is already present in the database (element 1104). A variety of similarity criteria may be used in different embodiments. For example, in one embodiment an exact match may be required between the TRR's tuning task and the client's tuning task, and indexes constructed at the database for various attributes of the tuning task may be used to determine whether a matching TRR is present in the database. In another embodiment, an embedding based approach to similarity analysis may be used, in which the values of the attributes of the TRR may be mapped to points in a high-dimensional embedding space, and distances computed between embeddings identified for the client's tuning task and the embeddings represented in the database may be used to determine similarity. The similarity threshold used to determine whether a database hit occurred or not may be a tunable parameter adjusted over time at the MLCTS in some embodiments.

If a sufficiently similar tuning task is found in the database (as determined in element 1107), based on the similarity criterion chosen, executable code corresponding to the tuned schedule in that TRR may be generated (e.g., using a supported compiler for the target HEE). The executable code may be provided to the client (element 1110) in various embodiments. In at least some implementations, it may take the MLCTS no more than a few milliseconds or a few seconds to provide the response to the client's request in the case of such a database hit.

If a sufficiently similar tuning task is not found in the database (as also determined in element 1107), a set of candidate schedules CS1 may be identified for the client's tuning task, e.g., using an auto-tuning framework in various embodiments (element 1113). The candidate schedules could potentially be executed in an exhaustive set of tests on the targeted HEE to identify the best performing schedule, but a different approach may be employed in the depicted embodiment to provide high-performing executable code to the client much more quickly. The number of candidate schedules may for example be in the thousands, depending on the complexity of the tuning task.

Instead of actually trying out all the schedules in CS1 by executing code, performance scores may be obtained for at least some of the CS1 schedules using the pre-trained performance prediction model (PPM) in the depicted embodiment (element 1116). The scores may then be used to rank the candidates relative to one another, and the top K (where K is a small integer) of the candidates may be selected for actual testing on the target HEE.

Performance results (as opposed to performance scores produced by the PPM) may be obtained for the K schedules on the target HEE (element 1119). This may, for example, take a few minutes instead of the hours or days it may have taken to try out all the CS1 schedules on the HEE. The best-performing schedule from among the K tested schedules maybe identified, and executable code for the best-performing or preferred schedule may be provided to the client (element 1122) in various embodiments.

Optionally, in at least some embodiments, larger distributed tuning experiments may be conducted based on the client request (element 1125), asynchronously to the processing and fulfillment of the client request. In such an embodiment, additional candidate schedules (e.g., some number M which is greater than K) or all the remaining candidate schedules from CS1 may be tried on the target HEE, and the results obtained may be added to the database of the MLCTS.

It is noted that in various embodiments, some of the operations shown in FIG. 10 and/or FIG. 11 may be implemented in a different order than that shown in the figure, or may be performed in parallel rather than sequentially. Additionally, some of the operations shown in FIG. 10 and/or FIG. 11 may not be required in one or more implementations.

Use Cases

The techniques described above, of rapidly providing executable code, tuned for specified execution environments, for various machine learning models may be extremely beneficial in a variety of scenarios. Many machine learning problems are best addressed using very large neural network models, often with numerous internal layers at which a variety of operators involving complex computations on high-dimensional vectors or tensors are implemented. In many cases, the performance achieved when such models are trained or run may differ substantially depending on the order in which various lower-level operations on the vectors are executed, as well as on the capabilities of the specific hardware execution environments being used. In order to schedule machine learning models' computations to obtain the best possible performance at a given execution environment, long and resource-intensive tuning experiments may have to be conducted. In the approach proposed herein, a growing collection of pre-tuned schedules is obtained at a network-accessible tuning service, with large scale distributed tuning experiments conducted asynchronously with respect to client requests for tuned code. Further, a set of performance prediction models for schedules whose results have not been measured from the distributed tuning experiments may be trained. When a client submits a request for tuned code, the service may often be able to provide the requested code in real time using the entries of the database. Even in scenarios in which the database does not contain results for the tuning tasks corresponding to the client's request, code which provides very good performance may be provided very quickly, e.g., by first obtaining estimated performance for a set of candidate schedules and then running a few short tests on the candidate schedules with the best performance among those analyzed with the help of the performance prediction model. As a result, the time taken by clients to obtain high-performance code for their machine learning models may be reduced substantially.

Illustrative Computer System

Figure 12:
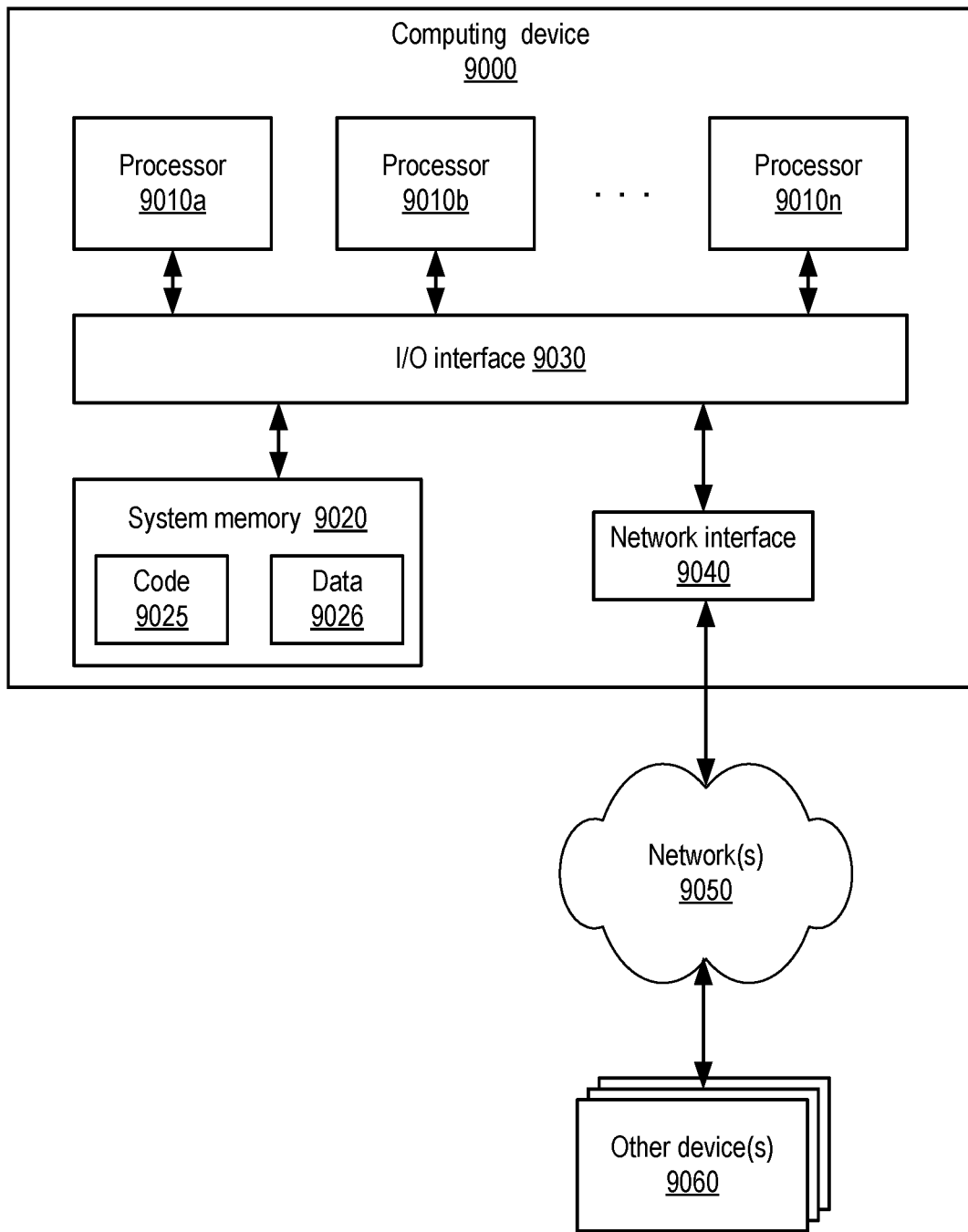
FIG. 12 is a block diagram illustrating an example computing device that may be used in at least some embodiments.

In at least some embodiments, a server that implements the types of techniques described herein (e.g., various functions of a machine learning code tuning service and other services of a provider network), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices comprising one or more respective processors and one or more respective memories;
   wherein the one or more respective memories of the one or more computing devices includes instructions that upon execution on or across the one or more respective processors of the one or more computing devices cause the one or more computing devices to:
      perform, using at least some resources of a tuning service of a provider network, one or more distributed tuning experiments at a plurality of execution environments to generate a plurality of tuning result records, wherein an individual tuning result record of the plurality of tuning result records includes respective representations of (a) a machine learning tuning task comprising at least a portion of code of a machine learning model, (b) a tuned schedule for executing one or more sub-operations of the machine learning tuning task, at a particular execution environment, wherein the tuned schedule indicates at least an order in which the one or more sub-operations are to be executed and (c) a performance result obtained by running executable code corresponding to the one or more sub-operations of the tuned schedule at the particular execution environment, and wherein at least one distributed tuning experiment is initiated without receiving a corresponding request from a client of the tuning service;
      store, in a database of the tuning service, the plurality of tuning result records;
      receive, via one or more programmatic interfaces of the tuning service, a first code tuning request to tune code from which a first machine learning tuning task, comprising a first portion of code of a machine learning model, is identified;
      in response to determining that a particular tuning result record whose tuning task satisfies a similarity criterion with respect to the first machine learning tuning task is present in the database, provide a first response to the first code tuning request, wherein the first response includes a first set of executable code corresponding to one or more sub-operations of a tuned schedule of the particular tuning result record whose tuning task satisfies the similarity criterion with respect to the first machine learning tuning task;
      receive, via the one or more programmatic interfaces, a second code tuning request to tune code from which a second machine learning tuning task, comprising a second portion of code of the machine learning model or another machine learning model, is identified;
      in response to determining that the database does not include a tuning result record whose tuning task satisfies a similarity criterion with respect to the second machine learning tuning task comprising the second portion of code of the machine learning model or the other machine learning model,
         obtain, from a performance prediction model, respective performance predictions corresponding to a first plurality of proposed schedules identified using an auto-tuning framework for the second machine learning tuning task, without running code which executes the first plurality of proposed schedules;
         select, from the first plurality of proposed schedules, a subset of proposed schedules based at least in part on the respective performance predictions;
         execute code corresponding to individual ones of the subset of proposed schedules to obtain corresponding performance results;
         select, based at least in part on the corresponding performance results, a particular schedule of the subset as a preferred schedule for the second machine learning tuning task; and
         provide a second response to the second code tuning request, wherein the second response includes a second set of executable code corresponding to one or more sub-operations of the preferred schedule.

2. The system as recited in claim 1, wherein the one or more computing devices include further instructions that upon execution on or across the one or more computing devices further cause the one or more computing devices to:
  train the performance prediction model, wherein a training data set for the performance prediction model is based at least in part on contents of a log generated during the one or more distributed tuning experiments.

3. The system as recited in claim 1, wherein the one or more computing devices include further instructions that upon execution on or across the one or more computing devices further cause the one or more computing devices to:
  initiate, in response to determining that the database does not include the tuning result record whose tuning task satisfies the similarity criterion with respect to the second machine learning tuning task, an additional distributed tuning experiment which includes one or more machine learning tuning tasks determined from the second tuning request, wherein the additional distributed tuning experiment is conducted asynchronously with respect to processing of the second tuning request.

4. The system as recited in claim 1, wherein at least one distributed tuning experiment of the one or more distributed tuning experiments utilizes one or more compute instances of a virtualized computing service of the provider network.

5. The system as recited in claim 1, wherein at least one distributed tuning experiment of the one or more distributed tuning experiments utilizes a processor of an Internet-of-things (IoT) device.

6. A computer-implemented method, comprising:
  storing, in a database of a tuning service, a plurality of result records, wherein an individual result record of the plurality of result records comprises a tuned schedule for executing a machine learning tuning task at a particular execution environment, wherein the machine learning tuning task comprises at least a portion of code of a machine learning model, and wherein the tuned schedule indicates at least an order in which one or more sub-operations of the machine learning tuning task are to be executed;
  in response to determining that a particular result record, whose tuning task satisfies a similarity criterion with respect to a first machine learning tuning task determined from a first code tuning request to tune code and comprising a first portion of code of a machine learning model, is present in the database:
    providing a first response to the first code tuning request, wherein the first response includes a first set of executable code corresponding to one or more sub-operations of a tuned schedule indicated in the particular result record whose tuning task satisfies a similarity criterion with respect to a first machine learning tuning task; and
  in response to determining that the database does not include a result record whose tuning task satisfies a similarity criterion with respect to a second machine learning tuning task determined from a second code tuning request to tune code and comprising a second portion of code of the machine learning model or another machine learning model,
    obtaining, from a performance prediction model at the tuning service, respective performance predictions indicating expected performance of executable code corresponding to a first plurality of candidate schedules identified by an auto-tuning framework for the second machine learning tuning task, without running code which executes the first plurality of candidate schedules; and
    providing a second response to the second code tuning request, wherein the second response includes a second set of executable code corresponding to one or more sub-operations of a preferred schedule selected from the first plurality of candidate schedules based at least in part on the respective performance predictions.

7. The computer-implemented method as recited in claim 6, wherein the particular result record indicates one or more of: (a) a latency metric obtained from an execution of the tuned schedule indicated in the particular result record at a particular execution environment, (b) a throughput metric obtained from an execution of the tuned schedule indicated in the particular result record at a particular execution environment, (c) an indication of a machine learning framework used for the tuned schedule indicated in the particular result record, or (d) a path to a log containing records of one or more tuning experiments which were used to identify the tuned schedule indicated in the particular result record.

8. The computer-implemented method as recited in claim 6, further comprising:
  performing, using at least some resources of the tuning service, a plurality of machine learning tuning tasks for respective machine learning models; and
  including one or more results obtained from the plurality of machine learning tuning tasks in a result record stored at the database.

9. The computer-implemented method as recited in claim 8, wherein at least one machine learning tuning task of the plurality of machine learning tuning tasks is executed using one or more compute instances of a virtualized computing service of a provider network.

10. The computer-implemented method as recited in claim 8, wherein at least one machine learning tuning task of the plurality of machine learning tuning tasks is executed at least in part at a processor of an Internet-of-things (IoT) device.

11. The computer-implemented method as recited in claim 6, wherein at least one result record stored in the database comprises a result of a machine learning tuning task conducted at least in part at a premise external to a data center of a provider network at which the tuning service is implemented.

12. The computer-implemented method as recited in claim 6, further comprising:
  obtaining, via one or more programmatic interfaces, a tuning task result, wherein said storing the plurality of result records comprises storing the tuning task result, wherein the tuning task result is obtained from one of (a) a client of the tuning service or (b) a vendor of an execution environment at which the tuning task result was obtained.

13. The computer-implemented method as recited in claim 6, further comprising:
  generating, based at least in part on analysis of machine learning model source code, a machine learning tuning task whose result is to be stored in a result record of the database.

14. The computer-implemented method as recited in claim 6, further comprising:
  training the performance prediction model, wherein a training data set for the performance prediction model is based at least in part on contents of a log generated during one or more machine learning tuning tasks whose results are stored in the database.

15. The computer-implemented method as recited in claim 6, wherein a tuned schedule indicated in a particular result record includes one or more of: (a) a traversal order of a vector or tensor, (b) an order in which one or more memory acquisition operations are to be interleaved with one or more computations, (c) a stride parameter, or (d) a tiling parameter.

16. One or more non-transitory computer-accessible storage media storing program instructions that when executed on or across one or more processors cause the one or more processors to:
  store, at a data store accessible from a tuning service, a plurality of result records, wherein an individual result record of the plurality of result records comprises a tuned schedule for executing a machine learning tuning task at a particular execution environment, wherein the machine learning tuning task comprises at least a portion of code of a machine learning model, and wherein the tuned schedule indicates at least an order in which one or more sub-operations of the machine learning tuning task are to be executed;
  in response to determining that the data store does not include a result record whose tuning target satisfies a similarity criterion with respect to a first tuning target, comprising a first portion of code of a machine learning model and determined from a first code tuning request to tune code,
    obtain, from a performance prediction model, respective performance predictions indicating expected performance of executable code corresponding to one or more candidate schedules identified by an auto-tuning framework for the first machine learning tuning task, without running code which executes the one or more candidate schedules; and
    provide a first response to the first code tuning request to tune code, wherein the first response includes a first set of executable code corresponding to one or more sub-operations of a preferred schedule selected from the one or more candidate schedules based at least in part on the respective performance predictions.

17. The one or more non-transitory computer-accessible storage media as recited in claim 16, wherein a particular result record stored at the data store indicates one or more of: (a) a latency metric obtained from an execution of the tuned schedule indicated in the particular result record at a particular execution environment, (b) a throughput metric obtained from an execution of the tuned schedule indicated in the particular result record at a particular execution environment, (c) an indication of a machine learning framework used for the tuned schedule indicated in the particular result record, or (d) a path to a log containing records of one or more tuning experiments which were used to identify the tuned schedule indicated in the particular result record.

18. The one or more non-transitory computer-accessible storage media as recited in claim 16, wherein at least a portion of contents of the plurality of result records are obtained from one or more distributed tuning experiments coordinated by the tuning service, the one or more non-transitory computer-accessible storage media storing further program instructions that when executed on or across the one or more processors further cause the one or more processors to:
  obtain, via one or more programmatic interfaces of the tuning service, an indication of a plurality of parameters to be tested in a particular distributed tuning experiment of the one or more distributed tuning experiments.

19. The one or more non-transitory computer-accessible storage media as recited in claim 16, storing further program instructions that when executed on or across the one or more processors further cause the one or more processors to:
  extract, from a machine learning model source code file indicated in the first tuning request, one or more of: (a) a machine learning operator to be executed in the machine learning tuning task or (b) a graph comprising a plurality of nodes, wherein individual ones of the plurality of nodes represent machine learning operators to be executed in the machine learning tuning task.

20. The one or more non-transitory computer-accessible storage media as recited in claim 16, wherein the performance prediction model comprises one or more of: (a) a neural network model or (b) a boosting tree based model.

* * * * *